(12) United States Patent
Akamatsu

(10) Patent No.: US 6,208,150 B1
(45) Date of Patent: Mar. 27, 2001

(54) ELECTRICAL DISCHARGE STATE DETECTING DEVICE FOR ELECTRICAL DISCHARGE MACHINING MACHINE

(75) Inventor: Koji Akamatsu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/071,942

(22) Filed: May 5, 1998

Related U.S. Application Data

(62) Division of application No. 08/510,849, filed on Aug. 3, 1995, now Pat. No. 5,751,155.

(30) Foreign Application Priority Data

Aug. 9, 1994 (JP) .................................................. 6-187309
Jul. 25, 1995 (JP) .................................................. 7-189351

(51) Int. Cl.[7] .............................. G01R 27/26; B23H 1/02
(52) U.S. Cl. ...................................... 324/678; 219/69.18
(58) Field of Search .................................. 324/678, 676; 219/69.18, 69.11, 69.16

(56) References Cited

U.S. PATENT DOCUMENTS

| | | | |
|---|---|---|---|
| 3,705,286 | * 12/1972 | Kondo | 219/69.18 |
| 4,004,123 | 1/1977 | Inoue | 219/69 |
| 5,496,984 | * 3/1996 | Goto | 219/69.18 |

FOREIGN PATENT DOCUMENTS

| | | | |
|---|---|---|---|
| 0551091A1 | 1/1993 | (EP) | B23H/1/00 |
| 0551091 | 7/1993 | (EP) . | |
| 53-98598 | 8/1978 | (JP) . | |
| 62-88514 | 4/1987 | (JP) . | |
| 5293714 | 9/1993 | (JP) . | |

* cited by examiner

Primary Examiner—Ernest Karlsen
(74) Attorney, Agent, or Firm—Sughrue, Mion, Zinn, Macpeak & Seas, PLLC

(57) ABSTRACT

An electrical discharge state detecting device for an electrical discharge machining machine which detects an electrical discharge state during an electrical discharge machining operation. The detecting device includes a high-pass filter for detecting a high-frequency component superimposed on an electrical discharge voltage or an electrical discharge current at a machining clearance between an electrode and a workpiece, a rectifying circuit for outputting a rectified component of the high-frequency component, a first integration circuit for integrating the rectified component, a reference voltage circuit, a second integrating circuit for integrating the reference voltage, a comparator for comparing the two integrated values, an electrical discharge generation detecting circuit for controlling starting and ending of the integrating circuits, a logic circuit, and a delay circuit and reset circuits.

4 Claims, 16 Drawing Sheets

FIG. 7

| Machining Current Value (A) | Mask Time Width | | Time Width Changing Signal |
|---|---|---|---|
| | m1 ($\mu$sec) | m2 ($\mu$sec) | |
| 1~20 | 2 | 4 | a1 |
| 21~80 | 8 | 10 | a2 |

FIG.14

| Ton | Vref |
|---|---|
| ~2 μsec | Vref1 |
| ~4 μsec | Vref2 |
| ~8 μsec | Vref3 |
| ⋮ | ⋮ |
| ~1024 μsec | Vref10 |
| ~2048 μsec | Vref11 |
| ~4096 μsec | Vref12 |

ELECTRICAL DISCHARGE STATE DETECTING DEVICE FOR ELECTRICAL DISCHARGE MACHINING MACHINE

This is a divisional of application Ser. No. 08/510,849 filed Aug. 3, 1995, now U.S. Pat. No. 5,751,155.

FIELD OF THE INVENTION

The present invention relates to an electrical discharge state detecting device for an electrical discharge machining machine which detects an electrical discharge state during an electrical discharge machining operation.

BACKGROUND OF THE INVENTION

Conventionally, it is known that an electrical discharge state in an electrical discharge machining in an electrical discharge machine can be judged by detecting the magnitude of a high-frequency component of the electrical discharge voltage waveform. This electrical discharge voltage waveform is a quite complex waveform including a high-frequency component. Accordingly, it is quite important to provide a technique in which only a characteristic waveform component is detected from the electrical discharge voltage waveform without fail and at high speed.

Japanese Laid-Open Patent Publication No. 5-293714 discloses an electrical discharge state detecting device for an electrical discharge machine. Referring to FIG. 11, illustrating a circuit of substantially the same constitution as that of this reference, the operation of this device will be described hereunder.

In FIG. 11, reference numeral 2 denotes an electrode of an electrical discharge machine, reference numeral 3 denotes a workpiece, and a machining clearance is formed between the electrode 2 and the workpiece 3. Reference numeral 1 denotes a machining power source of the electrical discharge machining machine. An electrical discharge voltage in the form of a pulse is supplied from the machining power source 1 to the machining clearance between the electrode 2 and the workpiece 3. Reference numeral 4 denotes a high-pass filter for use in detecting a high-frequency component of the electrical discharge voltage, reference numeral 5 denotes a rectifying circuit for rectifying the high-frequency component from the high-pass filter 4, and an output signal vrec is outputted from the rectifying circuit 5. In addition, reference numeral 6 denotes an electrical discharge generation detecting circuit for detecting generation of the electrical discharge in the machining clearance between the electrode 2 and the workpiece 3. The electrical discharge generation detecting circuit 6 is composed of an electrical discharge voltage detecting circuit 60 for detecting the electrical discharge voltage at the machining clearance between the electrode 2 and the workpiece 3 and of an electrical discharge current detecting circuit 61 for detecting an electrical discharge current at the machining clearance between the electrode 2 and the workpiece 3.

An output signal 60s of the electrical discharge voltage detecting circuit 60 and an output signal 61s of the electrical discharge current detecting circuit 61, in the electrical discharge generation detecting circuit 6, are inputted to a logic circuit 62. Reference numeral 7 denotes a delay circuit. The delay circuit 7 is composed of a time constant circuit 70 for measuring a time constant tH of the high-pass filter 4 and of a logic circuit 72. An output signal 63 from the logic circuit 62 is inputted to the time constant circuit 70 and the logic circuit 72 in the delay circuit 7. An output signal 71 from the time constant circuit 70 is inputted to the logic circuit 72.

Reference numeral 8 denotes an integrating circuit. The integrating circuit 8 is composed of an operational amplifier 80, a capacitor Cl connected between the inverting (−) input terminal and the output terminal of the operational amplifier 80, and a resistor R1 connected in series between the output terminal of the rectifying circuit 5 and the inverting (−) input terminal of the operational amplifier 80. In addition, non-inverting (+) input terminal of the operational amplifier 80 is connected to the ground.

Reference numeral 9 denotes a reset circuit. The reset circuit 9 is comprised of a transistor of which collector-emitter terminals are connected between both terminals of the capacitor Cl. An output signal 73 from the logic circuit 72 of the delay circuit 7 is inputted to the reset circuit 9. Then, reference numeral 10 denotes a comparator. An integrated output value Vint as the output signal from the operational amplifier 80 of the integrating circuit 8 is inputted to the inverting (−) input terminal of the comparator 10, and a reference voltage Vref is inputted to the non-inverting (+) input terminal of the comparator circuit 10.

FIG. 12 shows input and output signal waveforms at main parts in FIG. 11. Reference character A in FIG. 12 indicates an electrical discharge voltage waveform at the machining clearance between the electrode 2 and the workpiece 3. Reference character B in FIG. 12 indicates an output signal waveform of the high-pass filter 4. Reference character I in FIG. 12 shows an output signal waveform in the logic circuit 72. Reference character F in FIG. 12 shows an integrated output signal waveform of the integrating circuit 8.

The operation of this arrangement will be described referring to FIGS. 11 and 12.

In FIGS. 11 and 12, reference numeral 20 denotes an electrical discharge voltage waveform at the machining clearance between the electrode 2 and the workpiece 3, wherein Ton denotes an electrical discharge pulse width and Toff denotes a rest time. When an electrical discharge is generated after applying a voltage to the machining clearance between the electrode 2 and the workpiece 3, both the output signals from the electrical discharge voltage detecting circuit 60 and the electrical discharge current detecting circuit 61 become H (high) levels. These output signals are inputted to the logic circuit 62. In the logic circuit 62, when all these input signals become H levels, i.e., when an electrical discharge is generated at the machining clearance between the electrode 2 and the workpiece 3, an L (low) level is outputted. Such a time is defined as an electrical discharge detecting time t1. t2 denotes a time (t2=t1 +tH) after the time constant tH of the high-pass filter 4 from the electrical discharge detecting time t1. Reference numeral 21 denotes a high-frequency component of the electrical discharge voltage. Reference numeral 22 denotes a disturbance waveform caused by a transient characteristic of the high-pass filter 4.

In the time constant circuit 70, the H level is outputted for the time period tH from the fall time of the output signal 63 of the logic circuit 62. The output signal 63 of the logic circuit 62 and the output signal 71 of the time constant circuit 70 are inputted to the logic circuit 72, and then the output signal 73 indicated at the code I in FIG. 12 is outputted. The rise time of the output signal 73 is defined as t2 at I in FIG. 12.

The reset circuit 9 resets the integrating circuit 8 for a period when the output signal 73 of the logic circuit 72 is the H level. That is, the output signal vrec from the rectifying circuit 5 is integrated at the integrating circuit 8 only for a period when the output signal 73 of the logic circuit 72 is the L level. In the comparator 10, the reference voltage Vref and an integration output Vint indicated by F in FIG. 12 are compared with each other. When the integration output Vint is higher than the reference voltage Vref at the end of the electrical discharge pulse width Ton, it judged to be a normal electrical discharge pulse. Otherwise, it is judged to be an abnormal electrical discharge pulse such as an arc electrical discharge pulse.

However, the aforesaid electrical discharge machining machine has some disadvantages as described below.

Referring to FIGS. 13a and 13b, a first disadvantage will be described.

FIGS. 13a and 13b are timing charts respectively showing a relation between an electrical discharge voltage waveform 20 and an integration output value Vint in the case that the same machining current value is selected. FIG. 13a shows a case in which the electrical discharge pulse width is a large one Ton1, and FIG. 13b shows another case in which the electrical discharge pulse width is a small one Ton2.

The integrated output value Vint from the integrating circuit 8 can be expressed by the following equation (1).

$$Vint = vrec \times Ton/(R1 \times C1) \quad (1)$$

where, vrec denotes an output signal from the rectifying circuit 5, Ton denotes an electrical discharge pulse width, R1 denotes a resistance value for determining an integration gain of the integrating circuit 8, and C1 denotes an electrostatic capacitance value for determining the integrating gain of the integrating circuit 8. It is known that a magnitude of the high-frequency component of the electrical discharge voltage depends on a magnitude of the machining current. However, as apparent from the equation (1), even if the same machining current value is selected as the machining condition, the integration output value Vint is proportional to the electrical discharge pulse width Ton. As shown by the integration output signal waveforms F in FIGS. 13a and 13b, it is necessary to change and set the reference value Vref in accordance with the electrical discharge pulse width Ton, which is set as a machining condition. The electrical discharge pulse width Ton is set, as the machining condition, to have a wide value ranging from a minimum value of about 2 sec to a maximum value of about 4096 sec. Then, as expressed by the equation (1), since the integration output value Vint is proportional to the electrical discharge pulse width Ton, the reference voltage Vref is also outputted, employing a data table shown in FIG. 14, corresponding to the electrical discharge pulse width Ton. Thus, a fine setting is not provided so that Vref11 is outputted as a reference value in respect to a electrical discharge pulse width of about 1025 to 2048 sec, for example.

In addition, it is possible not to use the electrical discharge pulse width but to always use Ton2, for a time to be compared with the reference value Vref, in case the electrical discharge pulse width is small. However, if the electrical discharge pulse width is large, an S/N ratio of the integrated output value Vint is decreased and that detecting accuracy is lowered.

Then, referring to FIGS. 15, 16 and 17, a second disadvantage will be described. FIG. 15 is a circuit diagram of the machining power source described in Japanese Utility Model Publication No. 57-33949. Reference character B1 denotes a DC power source, B2 denotes an auxiliary power source, S1 denotes a first switch, S2 denotes a second switch, D1 denotes a first diode, D2 denotes a second diode, R2 denotes a current detecting resistor, C2 denotes a capacitor, L1 denotes a reactor, reference numeral 400 denotes a pulse generator, and reference numeral 300 denotes a control circuit for the first switch S1.

FIG. 16 shows input/output signal waveforms at the main parts in FIG. 15. Numerals 1 and 0 of the first switch S1 and the second switch S2 denote ON/OFF states of the switches S1 and S2, respectively, wherein L1 denotes a current waveform flowing in the reactor L1 which is detected by the current detecting resistor R2. The switch S2 is kept in the ON state during a full period of the electrical discharge pulse width Ton. The control circuit 300 controls the switch S1 in such a manner that the output current becomes a predetermined value. As shown in FIG. 16, the switch S1 repeats ON/OFF operations for several times during the period of the electrical discharge pulse Ton. A large amount of electrical power is consumed in the resistor in a system which uses a resistor as a current limiting element. However, the system shown in FIGS. 15 and 16 is a current control system in which the current is controlled by the reactor L1 and the control circuit 300, so that it can be said that this is a superior system in which the electrical power consumed in the circuit is quite low. This type of machining power source is defined as a reactor type power source hereinbelow.

FIG. 17 shows input and output signal waveforms at the main parts when the reactor type power source is used in the electrical discharge state detecting device shown in FIG. 11. Reference character A in FIG. 17 indicates an electrical discharge voltage waveform, reference character B in FIG. 17 indicates an output signal waveform of the high-pass filter 4, reference character I in FIG. 17 indicates an output signal waveform of the logic circuit 72, and reference character F in FIG. 17 indicates an output signal waveform of the integrating circuit 8. Referring to the waveform A in FIG. 17, a spike-like voltage, which is synchronous with the ON/OFF transitions of the switch S1, appears in the electrical discharge voltage waveform 20 as shown by a numeral 23 in addition to the high-frequency component 21. This spike voltage 23 is a high-frequency component which is generated by an operation of the switch S1 without any relation with the electrical discharge machining phenomenon. Erroneous detection is caused by the spike voltage 23 in the electrical discharge state detecting device shown in FIG. 11, which is intended to detect the high-frequency component in the electrical discharge machining phenomenon.

This erroneous detection will be described hereunder.

The component of the spike voltage 23 of the electrical discharge voltage waveform A in FIG. 17 appears in the output signal waveform of the high-pass filter 4, as shown by the waveform B in FIG. 17, as the spike voltage 24. The time duration, in which the spike voltage 24 appears is defined as b1 when the switch S1 is turned on, and defined as b2 when the switch S1 is turned off. On the other hand, the time duration in which this spike voltage 24 appears depends upon the magnitude of the machining current. Reference character F in FIG. 17 shows an output signal waveform of the integrating circuit 8. Its integrated output value increases, as indicated by a solid line, every time the spike voltage 24 is generated. An integrated output value is shown as Vint2 when the reactor type power source is used as the machining power source, while an integrated output value is shown as Vint1 when it is not used. Since the integrated output value Vint2 is a sufficiently larger value than the integrated output value Vint1, it is impossible to perform accurate detection of the high-frequency component due to the electrical discharge phenomenon. That is, erroneous detection occurs due to the electrical discharge pulse, the integrated output value of the high-frequency component in the electrical discharge phenomenon is small and thus should be ordinarily be judged as an abnormal electrical discharge, but is nevertheless judged as a normal pulse.

In view of the above, the present invention is made in order to solve these disadvantages, and it is an object of the present invention to provide an electrical discharge state detecting device for an electrical discharge machine which is capable of correctly detecting a normal electrical discharge pulse in an electrical discharge state of the electrical discharge machining.

SUMMARY OF THE INVENTION

The electrical discharge state detecting device of an electrical discharge machine according to the invention comprises: high-frequency component detecting means for detecting a high-frequency component superimposed on either an electrical discharge voltage or an electrical discharge current at a machining clearance between an electrode and a workpiece; first integrating means for integrating, over time, the magnitude of the high-frequency component detected by the high-frequency component detecting means; reference voltage output means for outputting a reference voltage; second integrating means for integrating, over time, the reference voltage outputted from the reference voltage output means; control means for controlling the starting and ending of integrations by the first integrating means and the second integrating means; and comparing means for comparing an integrated value obtained by the first integrating means with an integrated value obtained by the second integrating means, which are controlled by the controlling means.

The first integrating means may use the magnitude of a rectified component obtained by rectifying the high-frequency component as the magnitude of the high-frequency component to be integrated over time.

The high-frequency component, which is superimposed on either the electrical discharge voltage or the electrical discharge current at the working clearance between the electrode and the workpiece, is detected by the high-frequency component detecting means. The magnitude of the high-frequency component is obtained through time-integration in the first integrating means. In addition, the magnitude of the reference voltage outputted from the reference voltage output means is subjected to time-integration in the second integrating means. Here, the starting and ending of the integrations in the first integrating means and second integrating means are controlled by the controlling means. The integrated value obtained by the first integrating means is compared with the integrated value obtained by the second integrating means through the comparing means. In this way, the reference voltage is integrated by the second integrating means, and the integrated value is employed as the comparison value for judging whether or not the electrical discharge state of the electrical discharge machine is a normal electrical discharge pulse or an abnormal electrical discharge pulse such as an arc electrical discharge pulse. Thus, it is possible to carry out precise setting of the reference value.

The magnitude of the high-frequency component, which is obtained through time-integration in the first integrating means, is the magnitude of the rectified component obtained by rectifying the high-frequency component. Thus, it is possible to make the variation of the integrated value smaller since the magnitude of the rectified component, obtained by rectifying the high-frequency component, is integrated over time.

The invention may further be realized by an electrical discharge state detecting device for an electrical discharge machine which comprises: high-frequency component detecting means for detecting a high-frequency component superimposed on either an electrical discharge voltage or an electrical discharge current at a machining clearance between an electrode and a workpiece; rectifying means for outputting a rectified component obtained by rectifying the high-frequency component detected by the high-frequency component detecting means; first integrating means for integrating, over time, the magnitude of the rectified component outputted from the rectifying means; reference voltage output means for outputting a reference voltage; second integrating means for integrating, over time, the magnitude of the reference voltage outputted from the reference voltage output means; integrating stopping means for stopping the integration in the first integrating means and the second integrating means only for a predetermined time on the basis of an operation of an internal switching element for use in current controlling of a machining power source; control means for controlling a starting and an ending of integration in the first integrating means and the second integrating means; and a comparing means for comparing an integrated value obtained by the first integrating means with an integrated value obtained by the second integrating means, which are controlled by the controlling means.

The high-frequency component, which is superimposed on either the electrical discharge voltage or the electrical discharge current at the working clearance between the electrode and the workpiece, is detected by the high-frequency component detecting means. The high-frequency component is rectified by the rectifying means, and the magnitude of the outputted rectified component is integrated over time by the first integrating means. In addition, the magnitude of the reference voltage outputted from the reference voltage output means is integrated over time by the second integrating means. The integrations in the first integrating means and second integrating means are stopped by the integration stopping means only for a predetermined period of time on the basis of an operation of the internal switching element for use in controlling current in the machining power source. The predetermined period of time is set to the time duration of the spike voltage generated at this time, and error factors of the integrated value are eliminated by stopping integration as above. Here, the starting and ending of the first integrating means and second integrating means are controlled by the control means. The integrated value from the first integrating is means is compared with the integrated value from the second integrating means through the comparing means. In this way, the integrating operation is stopped only for a predetermined period of time in synchronous with an operation of the internal switching element for use in controlling current in the machining power source, so that it is possible to eliminate influence of disturbances and to perform accurate detection of the electrical discharge state.

The electrical discharge state detecting device of electrical discharge machine of the invention may also comprise: high-frequency component detecting means for detecting a high-frequency component superimposed on either an electrical discharge voltage or an electrical discharge current at a machining clearance between an electrode and a workpiece; rectifying means for outputting a rectified component obtained by rectifying the high-frequency component detected by the high-frequency component detecting means; reference voltage output means for outputting a reference voltage; difference output means for outputting a difference between the rectified component outputted from the rectifying means and the reference voltage outputted from the reference voltage outputting means; integrating means for integrating, over time, the difference outputted from the difference output means; integration stopping means for stopping integration in the integrating means only for a predetermined time on the basis of an operation of an internal switching element for use in current controlling of a machining power source; control means for controlling starting and ending of the integration in the first integrating means; and comparing means for comparing an integrated value obtained by the integrating means, which is controlled by the controlling means, with a predetermined reference value.

The high-frequency component, which is superimposed on either the electrical discharge voltage or the electrical discharge current at the machining clearance between the electrode and the workpiece, is detected by the high-frequency component detecting means. The high-frequency component is rectified by the rectifying means, and the difference between the outputted rectified component and the reference voltage outputted from the reference voltage outputting means is outputted from the difference voltage outputting means and is integrated over time by the integrating means. The integration in the integrating means is stopped by the integration stopping means only for a predetermined period of time on the basis of an operation of the internal switching element for use in controlling current in the machining power source. The predetermined period of time is set to the time duration of the spike voltage generated at this time, and error factors of the integrated value are eliminated by stopping the integration as above. Here, the starting and stopping of the integrating means are controlled by the control means. The integrated value of the integrating means is compared with the reference value 0 through the comparing means. In this way, the difference between the rectified component of the high-frequency component and the reference voltage is integrated over time and compared with the reference value, so that it is possible to reduce the number of integrating means and the integration stopping means for stopping the integration only for a predetermined period of time, thereby simplifying the circuit configuration.

Still further, the electrical discharge state detecting device of the invention may comprise: high-frequency component detecting means for detecting a high-frequency component superimposed on either an electrical discharge voltage or an electrical discharge current at a machining clearance between an electrode and a workpiece; rectifying means for outputting a rectified component obtained by rectifying the high-frequency component detected by the high-frequency component detecting means; first integrating means for integrating, over time, the rectified component outputted from the rectifying means; reference voltage output means for outputting a reference voltage; second integrating means for integrating, over time, the reference voltage outputted from the reference voltage output means; integration stopping means for stopping integrations in the first integrating means and the second integrating means only for a predetermined time on the basis of an operation of an internal switching element for use in current controlling of a machining power source; time changing means for changing a duration of the predetermined time, for stopping the integration in the integrating stopping means, in accordance with a magnitude of a machining current value; control means for controlling starting and ending of the integrations in the first integrating means and the second integrating means; and comparing means for comparing an integrated value obtained by the first integrating means with an integrated value obtained by the second integrating means, which are controlled by the controlling means.

The high-frequency component, which is superimposed on either the electrical discharge voltage or the electrical discharge current at the machining clearance between the electrode and the workpiece, is detected by the high-frequency component detecting means. The high-frequency component is rectified by the rectifying means, and the magnitude of the outputted rectified component is integrated over time by the first integrating means. The magnitude of the reference voltage outputted from the reference voltage output means is integrated over time by the second integrating means. The integrations in the first integrating means and second integrating means are stopped by the integration stopping means only for a predetermined period of time on the basis of an operation of the internal switching element for use in controlling current in the machining power source. The duration of the predetermined period of time, for which the integrations are stopped by the integration stopping means, is changed by the time changing means in accordance with the magnitude of the machining current value. The predetermined period of time is properly set to the time duration of the spike voltage generated in accordance with a magnitude of the machining current value, and error factors in the integrated value are eliminated by stopping the integrations as above. Here, the starting and stopping of the first integrating means and second integrating means are controlled by the control means. The integrated value from the first integrating means is compared with the integrated value from the second integrating means through the comparing means. In this way, a mask time limit is changed in accordance with the value of the machining current, so that it is possible to surely eliminate the influence of disturbances and perform accurate detection of the electrical discharge state.

Still further, the invention may be practiced by an electrical discharge state detecting device for an electrical discharge machine comprising: high-frequency component detecting means for detecting a high-frequency component superimposed on either an electrical discharge voltage or an electrical discharge current at a machining clearance between an electrode and a workpiece; rectifying means for outputting a rectified component obtained by rectifying the high-frequency component detected by the high-frequency component detecting means; count means for counting a number of continual electrical discharge pulses; first integrating means for integrating, over time, the magnitude of the rectified component outputted from the rectifying means and adding it only for the number of electrical discharging pulses counted by the count means; reference voltage output means for outputting a reference voltage; second integrating means for integrating, over time, the magnitude of the reference voltage outputted from the reference voltage output means and adding it only for the number of electrical discharging pulses counted by the count means; control means for controlling starting and ending of integration in the first integrating means and the second integrating means; and comparing means for comparing an integrated value obtained by the first integrating means with an integrated value obtained by the second integrating means, which are controlled by said controlling means.

The high-frequency component, which is superimposed on either the electrical discharge voltage or the electrical discharge current at the machining clearance between the electrode and the workpiece, is detected by the high-frequency component detecting means. The high-frequency component is rectified by the rectifying means. The magnitude of the outputted rectified component is integrated over time by the first integrating means and added only for the number of continual electrical discharge pulses counted by the count means. In addition, the magnitude of the reference voltage outputted from the reference voltage output means is integrated over time by the second integrating means and added only for the number of continual electrical discharge pulses counted by the count means. Here, the starting and ending of the integration in the first integrating means and second integrating means are controlled by the control means. The integrated value obtained by the first integrating means is compared with the integrated value obtained by the second integrating means through the comparing means. In this way, the high-frequency components are integrated over time for is the continual electrical discharge pulses, so that it is possible to perform accurate detection of the electrical discharge state even if the electrical discharge pulse width is narrow.

BRIEF DESCRIPTION OF THE DRAWINGS

FIG. 7 is a data table showing a machining current value obtained by a mask time limit output circuit, and a time width changing signal corresponding to the mask time width, in the electrical discharge state detecting device of an electrical discharge machine in accordance with a fourth embodiment of the present invention.

FIG. 14 is a data table showing the relation between a pulse width Ton and a reference voltage Vref in the conventional electrical discharge state detecting device for an electrical discharge machine.

DESCRIPTION OF THE PREFERRED EMBODIMENTS

The invention is described on the basis of illustrative embodiments.

Figure 1:
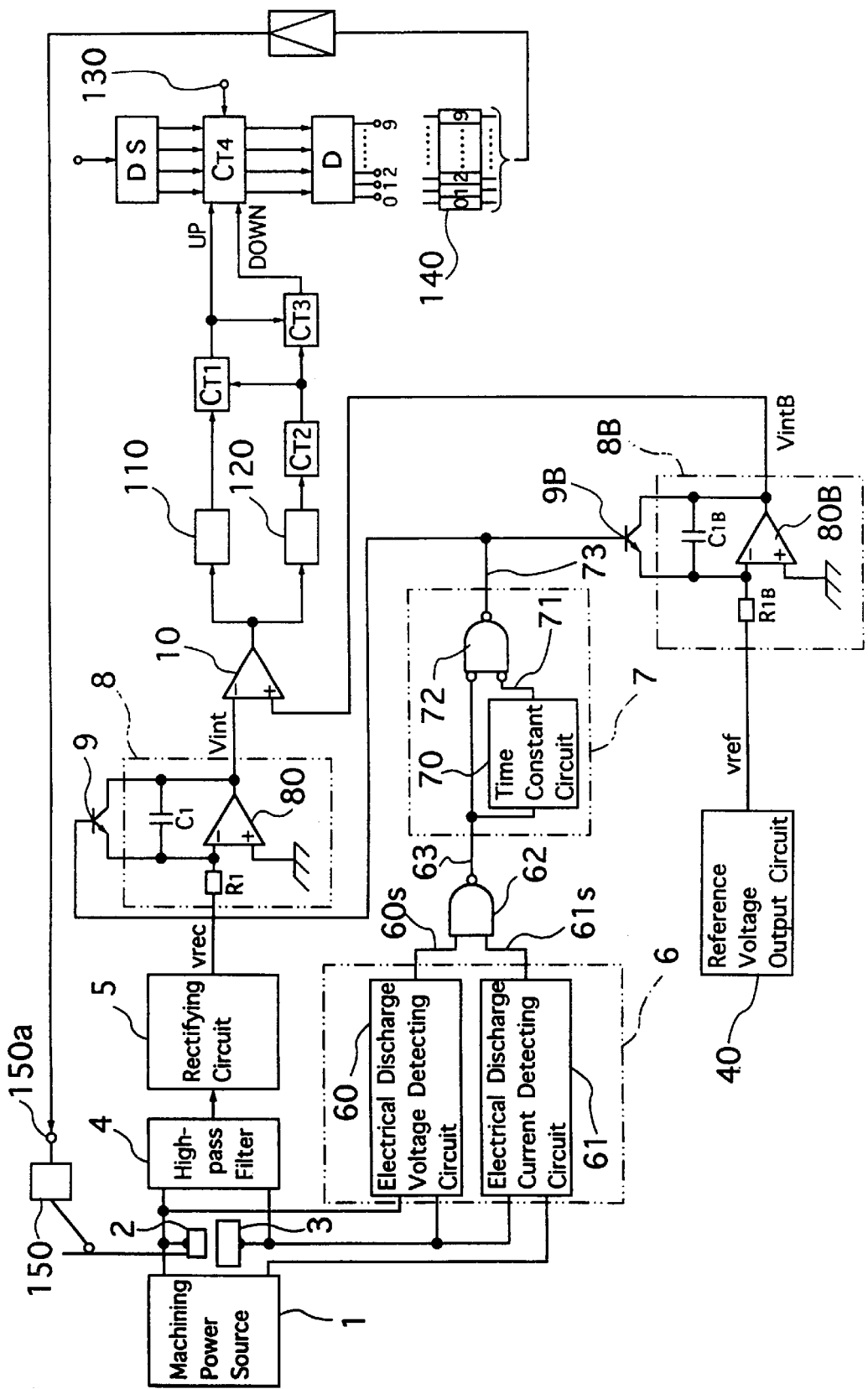
FIG. 1 is a circuit diagram illustrating the configuration of an electrical discharge state detecting device of an electrical discharge machine constructed according to a first embodiment of the present invention.

First Embodiment:

FIG. 1 is a circuit diagram illustrating the configuration of an electrical discharge state detecting device of an electrical discharge machine constructed according to a first embodiment of the present invention. The same configuration as that of the aforedescribed prior art device or corresponding portions are indicated by the same reference numerals and characters.

In FIG. 1, reference numeral 2 denotes an electrode of the electrical discharge machine, and reference numeral 3 denotes a workpiece. A machining clearance is formed between the electrode 2 and the workpiece 3. Reference numeral 1 denotes a machining power source of the electrical discharge machine; a pulse-like electrical discharge voltage is supplied to the machining clearance between the electrode 2 and the workpiece 3 from the machining power source 1. Reference numeral 4 denotes a high-pass filter for detecting a high-frequency component of the electrical discharge voltage, reference numeral 5 denotes a rectifying circuit for rectifying the high-frequency component from the high-pass filter 4, and a rectified output signal vrec is outputted from the rectifying circuit 5. Reference numeral 6 denotes an electrical discharge generation detecting circuit for the machining clearance between the electrode 2 and the workpiece 3. The electrical discharge generation detecting circuit 6 is composed of an electrical discharge voltage detecting circuit 60 for detecting an electrical discharge voltage at the machining clearance between the electrode 2 and the workpiece 3 and of an electrical discharge current detecting circuit 61 for detecting an electrical discharge current at the machining clearance between the electrode 2 and the workpiece 3.

Output signals obtained from the electrical discharge voltage detecting circuit 60 and the electrical discharge current detecting circuit 61 of the electrical discharge detecting circuit 6 are inputted to a logic circuit 62. Reference numeral 7 denotes a delay circuit, which is composed of a time constant circuit 70 for measuring a time constant tH of the high-pass filter 4 and of a logic circuit 72. An output signal 63 from the logic circuit 62 is inputted to the time constant circuit 70 and the logic circuit 72 of the delay circuit 7. The output signal 71 from the time constant circuit 70 is inputted to the logic circuit 72. Reference numeral 8 denotes an integrating circuit, and the integrating circuit 8 is composed of an operational amplifier 80, a capacitor C1 connected between the inverting (−) input terminal and the output terminal of the operational amplifier 80, and a resistor R1 connected in series between the output terminal of the rectifying circuit 5 and the inverting (−) input terminal of the operational amplifier 80. The non-inverting (+) input terminal of the operational amplifier 80 is connected to ground.

Reference numeral 9 denotes a reset circuit, and the reset circuit 9 is composed of a transistor having a collector and an emitter connected between both terminals of the capacitor C1. The output signal 73 form the logic circuit 72 of the delay circuit 7 is inputted to a base terminal of the transistor of the reset circuit 9. Reference numeral 10 is a comparator. An integrated output value Vint, which is an output signal from the operational amplifier 80 of the integrating circuit 8, is inputted to the inverting (−) input terminal of the comparator 10.

Reference numeral 40 denotes a reference voltage output circuit, reference numeral 8B denotes an integrating circuit. The integrating circuit BB has a similar configuration to that of the integrating circuit 8, and is composed of an operational amplifier 80B, a capacitor C1B connected between the inverting (−) input terminal and the output terminal of the operational amplifier 80B, and a resistor R1B connected in series between the output terminal of the reference voltage output circuit 40 and the inverting (−) input terminal of the operational amplifier 80B. The reference voltage vref from the reference voltage output circuit 40 is inputted to the resistor R1B of the integrating circuit 8B. In addition, reference numeral 9B denotes a reset circuit. The reset circuit 9B has a similar configuration to that of the reset circuit 9, and is composed of a transistor having a collector and an emitter connected between both terminals of the capacitor C1B. The output signal 73 from the logic circuit 72 of the delay circuit 7 is inputted to a base of the transistor of the reset circuit 9B. An integrated output value VintB, which is the output signal from the operational amplifier 80B of the integrating circuit 8B, is inputted to the non-inverting (+) input terminal of the comparator 10.

Figure 11:
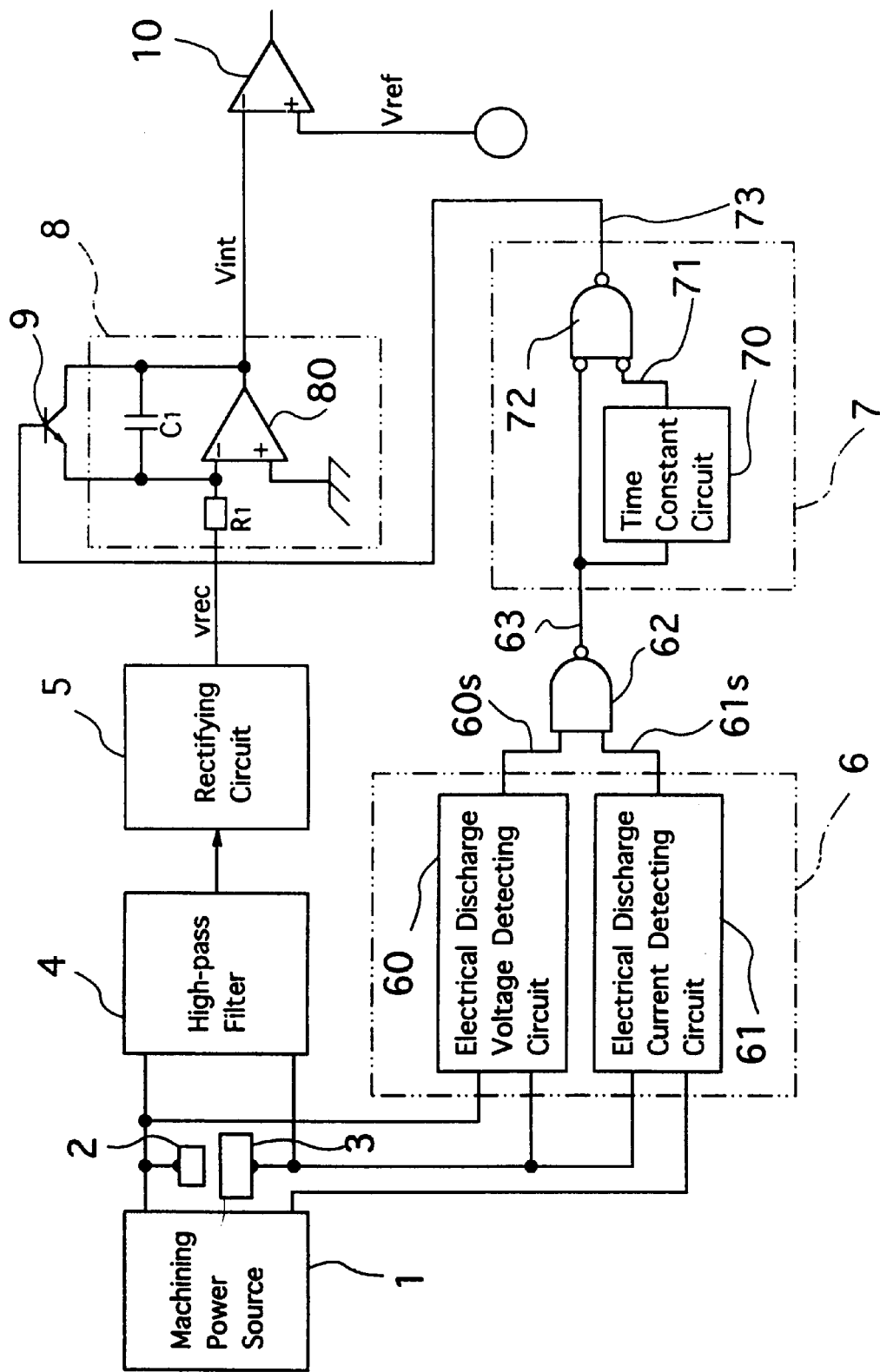
FIG. 11 is a circuit diagram showing the configuration of a conventional electrical discharge state detecting device of an electrical discharge machine.
Figure 12:
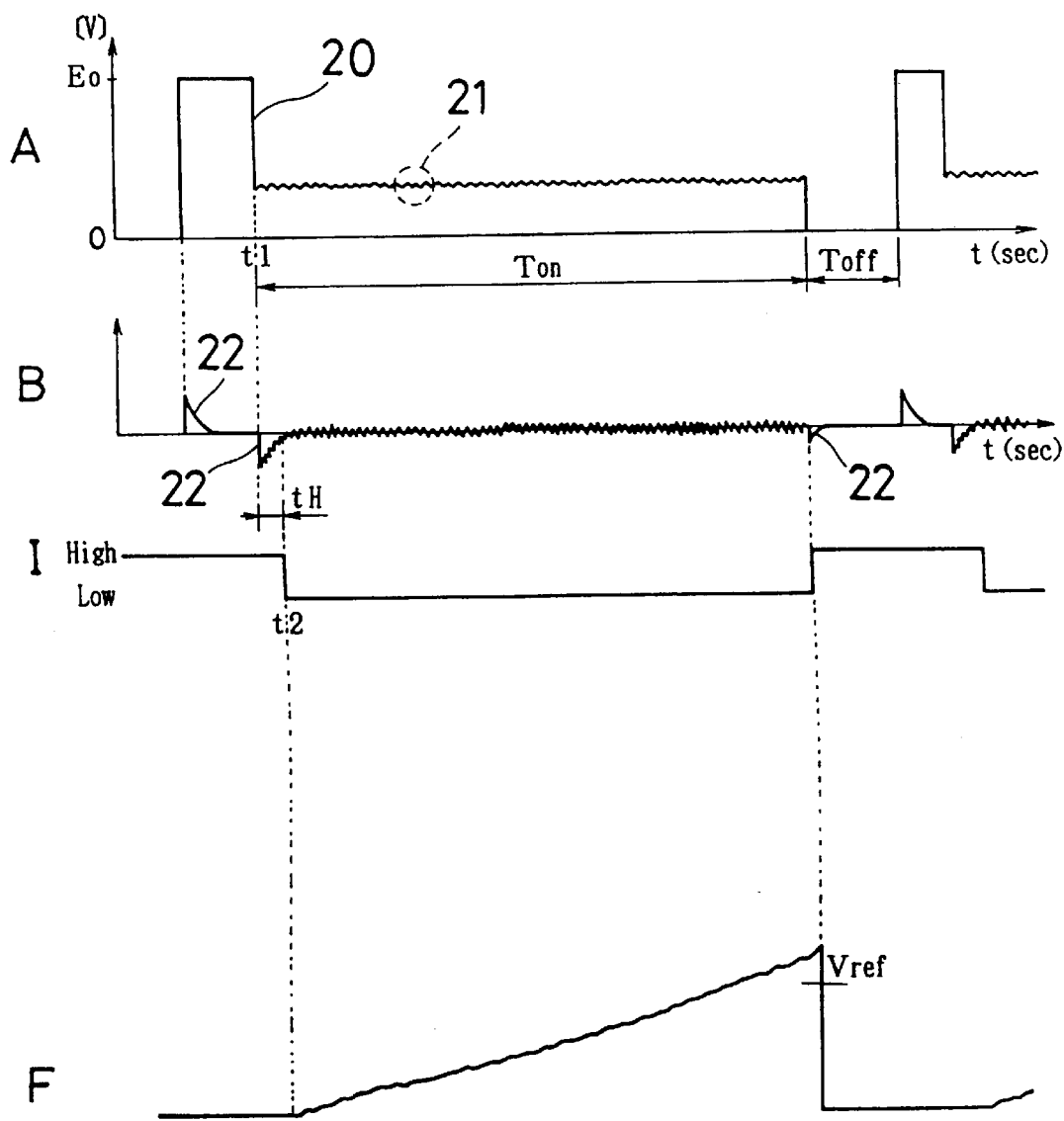
FIG. 12 is a timing chart showing input/output signal waveforms at main parts of FIG. 11.
Figure 13A:
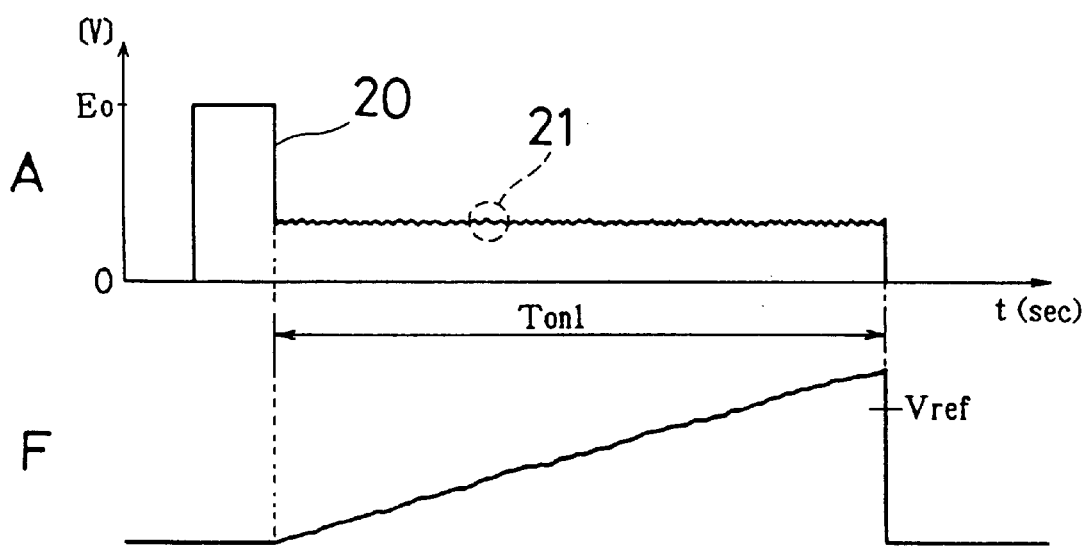
FIGS. 13a and 13b are timing charts showing the relation between an electrical discharge voltage waveform and an integrated output value in case of selecting the same machining current value in the conventional electrical discharge state detecting device for an electrical discharge machine.
Figure 13B:
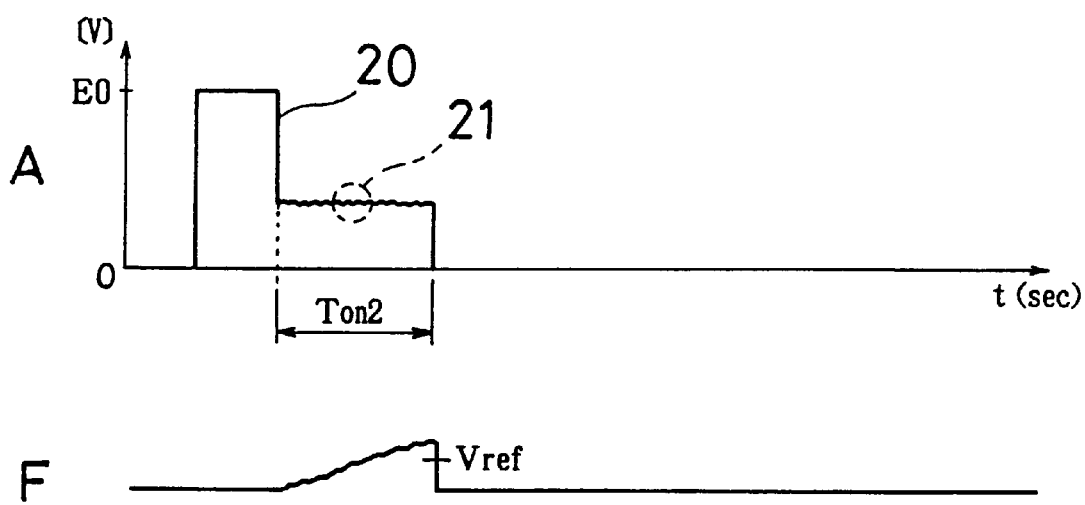
Figure 15:
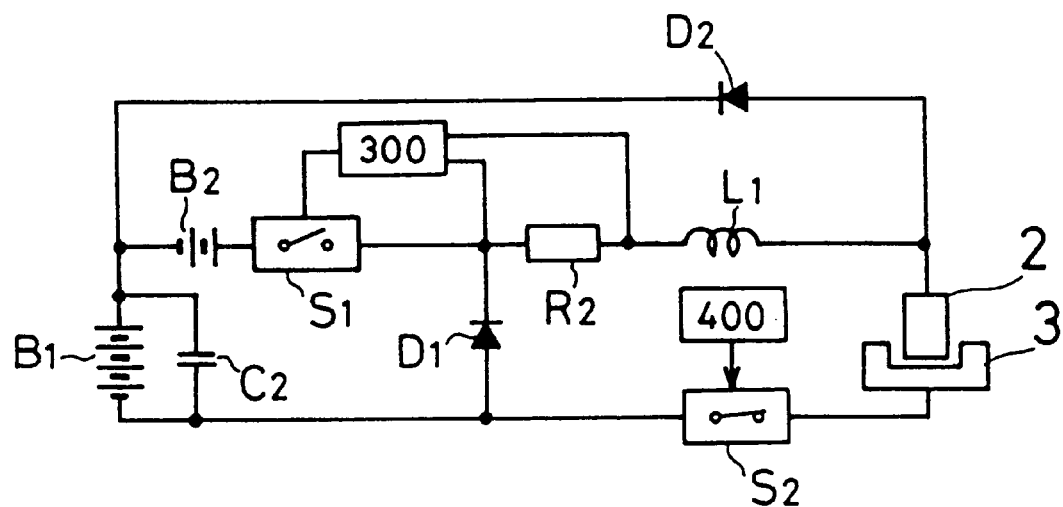
FIG. 15 is a circuit diagram showing details of a machining power source of the conventional electrical discharge state detecting device for an electrical discharge machine.

The reference voltage Vref in FIGS. 11 and 12 in the aforementioned prior art device and the reference voltage vref outputted from the reference voltage output circuit 40 in FIG. 1, i.e., a device of the present embodiment, have a relation as specified by the following equation (2):

$$Vref = vref \times Ton/(R1B \times C1B) \qquad (2)$$

Accordingly, the integrated output value VintB, which is obtained by integrating over time the reference voltage vref in the integrating circuit 8B, becomes the reference voltage Vref indicated by the equation (2). The integrated output value Vint of the high-frequency is component and the integrated output value VintB of the reference voltage vref are compared to each other in the comparing circuit 10. In case the integrated output value Vint is larger than the integrated output value VintB, the output signal is "0", and it is judged to be a normal electrical discharge pulse. In case the integrated output value Vint is smaller than the integrated output value VintB, it is judged to be an abnormal electrical discharge pulse such as an arc electrical discharge pulse.

Feedback control based on the output signals from the comparing circuit 10 is described hereunder.

In FIG. 1, reference numeral 110 denotes an abnormal electrical discharge judging circuit for sensing an abnormal electrical discharge pulse such as an arc electrical discharge pulse, which is caused by a defective machining clearance or the like. If the comparing circuit 10 outputs a signal "1" at a predetermined timing and the abnormal electrical discharge judging circuit 110 judges that it is an abnormal electrical discharge pulse, the number is counted by the counter CT1 implemented in an IC.

Reference numeral 120 is a normal electrical discharge judging circuit for sensing a normal electrical discharge pulse. If the comparing circuit 10 outputs a signal "0" at a predetermined timing and the normal electrical is discharge judging circuit 120 judges that it is a normal electrical discharge pulse, the number is counted by the counter CT2 also implemented in an IC.

The counter CT1 outputs a signal if it counts the abnormal electrical discharge pulses, e.g., up to four, and the signal is inputted to an UP terminal of an up-down counter CT4, which has ten stages from 0 to 9. The counter CT2 outputs a signal if it counts the normal electrical discharge pulses, e.g., up to eight, and the signal is inputted to a clear signal input terminal and a counter CT3. The counter CT3 outputs a signal if the signals outputted from the counter CT2 reach, e.g., eight or sixteen. This signal is inputted to the UP terminal of the up-down counter CT4. The signal outputted from the counter CT1 is inputted to the clear signal input terminal of the counter CT3.

Each of the counters CT1, CT2 and CT3 is constructed such that it clears its count value when the count number reaches a preset count number. Namely, if the counter CT1 counts abnormal electrical discharge pulses up to four before the counter CT2 counts normal electrical discharge pulses up to eight, the count number of the up-down counter CT4 increases by one, and the count number of the counter CT3 is cleared. Here, unless the counter CT1 counts four during each eight counts of the counter CT2 while the counter CT2 counts eight times or sixteen is times of the eight counts, the counter CT3 generates an output, and the count number of the up-down counter CT4 decreases by one.

Reference numeral 130 denotes the clear signal input terminal of the up-down counter CT4, DS denotes a digital switch for manually setting a desired count number for the up-down counter CT4 except 0 or 9, D denotes a decoder for outputting a signal to one of its output terminals 0 to 9, which correspond to the count number of the up-down counter CT4, and reference numeral 140 denotes a machining condition setting unit which has ten setting stages from 0 to 9 for a separating distance of a reciprocating motion and a cycle of a reciprocating movement (or a machining time in a short distance). In the machining condition setting unit 140, an Nth stage of machining condition, which is selected corresponding to an output from the decoder D, is operated. Then, a terminal 150a inputs an electrode raising pulse signal, which has a pulse width for assuring a predetermined separating distance at a preset fixed cycle, into a servo control unit 150, so that the electrode 2 is actuated under servo-feed control to the workpiece 3.

The operated stage of the machining condition setting unit 140 is not changed as long as the counter CT1 or the counter CT3 outputs a signal so as to increase or decrease and change the count number of the up-down counter CT4. Moreover, signals of a preset pulse width are repeatedly outputted for the servo control unit 150 to make the operated stage carry out an opening operation through a predetermined opening distance at a preset cycle.

With such a structure, if the abnormal electrical discharge judging circuit 110 counts four or more abnormal electrical discharge pulses through the counter CT1 during a predetermined time period, i.e., while the counter CT2 counts eight normal electrical discharge pulses, the machining condition setting unit 140, which is able to set the opening distance for the reciprocating motion into two or more steps, masks one count for the count number of the up-down counter CT4, thereby switching the machining condition setting unit 140 such that the opening distance is made larger or longer.

To the contrary, in case of switching the machining condition setting unit 140 such that the opening distance is made shorter, the machining condition setting unit 140 is switched so as to make the opening distance longer after clearing the counter CT3, namely, after the output from the counter CT1. Thereafter, a down signal is inputted to the up-down counter CT4 so as to operate it to reduce one count from the count number, unless the abnormal electrical discharge judging circuit 110 counts four or more abnormal electrical discharge pulses through the counter CT1 at any time during a time period longer than the predetermined time period, namely, while the counter CT3 counts from one or more times to eight times or to sixteen times of eight counts of the normal electrical discharge pulses, which are counted by the counter CT2. Thus, there are no abnormal electrical discharge pulses at all, and the opening distance for the reciprocating movement is changed and kept into a state such that table machining is possible by the normal electrical discharge pulses.

As described above, the present embodiment of the electrical discharge state detecting device for an electrical discharging machine comprises: the high-frequency component detecting means composed of the high-pass filter for detecting a high-frequency component superimposed on either an electrical discharge voltage or an electrical discharge current at the machining clearance between the electrode 2 and the workpiece 3; the first integrating means composed of the integrating circuit 8 for integrating, over time, the magnitude of the high-frequency component detected by the high-frequency component detecting means; the reference voltage output means composed of the reference voltage output circuit 40 for outputting the reference voltage vref; the second integrating means composed of the integrating circuit 8B for integrating, over time, the magnitude of the reference voltage vref outputted from the reference voltage output means; the control means for controlling a starting and an ending of the integrations of the first integrating means and second integrating means, including the electrical discharge generation detecting circuit 6, the logic circuit 62, the delay circuit 7 and the reset circuits 9 and 9B; and the comparing means composed of the comparator 10 for comparing an integrated value Vint obtained by the first integrating means and an integrated value VintB obtained by the second integrating means, which are controlled by the controlling means.

Accordingly, the high-pass filter 4 detects the high-frequency component superimposed on either the electrical discharge voltage or the electrical discharge current at the machining clearance between electrode 2 and the workpiece 3. The magnitude of the high-frequency component is integrated over time by the integrating circuit 8. In addition, the magnitude of the reference voltage vref outputted from the reference voltage output circuit 40 is integrated over time by the integrating circuit 8B. Here, the starting and ending of the integrations in the integrating circuit 8 and integrating circuit 8B are controlled by the electrical discharge generation detecting circuit 6, logic circuit 62, delay circuit 7 and reset circuits 9 and 9B. The integrated value Vint obtained by the integrating circuit 8 is compared with the integrated value VintB obtained by the integrating circuit 8B through the comparator 10.

In this way, the reference voltage vref is integrated over time by the integrating circuit 8B, and its integrated value VintB is employed as the comparison value for judging if the electrical discharge state of the electrical discharge machine is a normal electrical discharge pulse or an abnormal electrical discharge pulse such as an arc electrical discharge pulse, so that precise setting of the reference value can be carried out.

In the electrical discharge state detecting device for an electrical discharge machine according to the present embodiment, the first integrating means, which is composed of the integrating circuit 8, uses a magnitude of a rectified component vrec obtained by rectifying the high-frequency component by the rectifying circuit 5 as the magnitude of the high-frequency component to be integrated over time.

In this way, it is possible to make the amount of variation of the integrated value smaller since the magnitude of the rectified component vrec, obtained by rectifying the high-frequency component, is integrated is over time. Therefore, it is possible to correctly judge if it is a normal electrical discharge pulse or an abnormal electrical discharge pulse such as an arc electrical discharge pulse.

Figure 2:
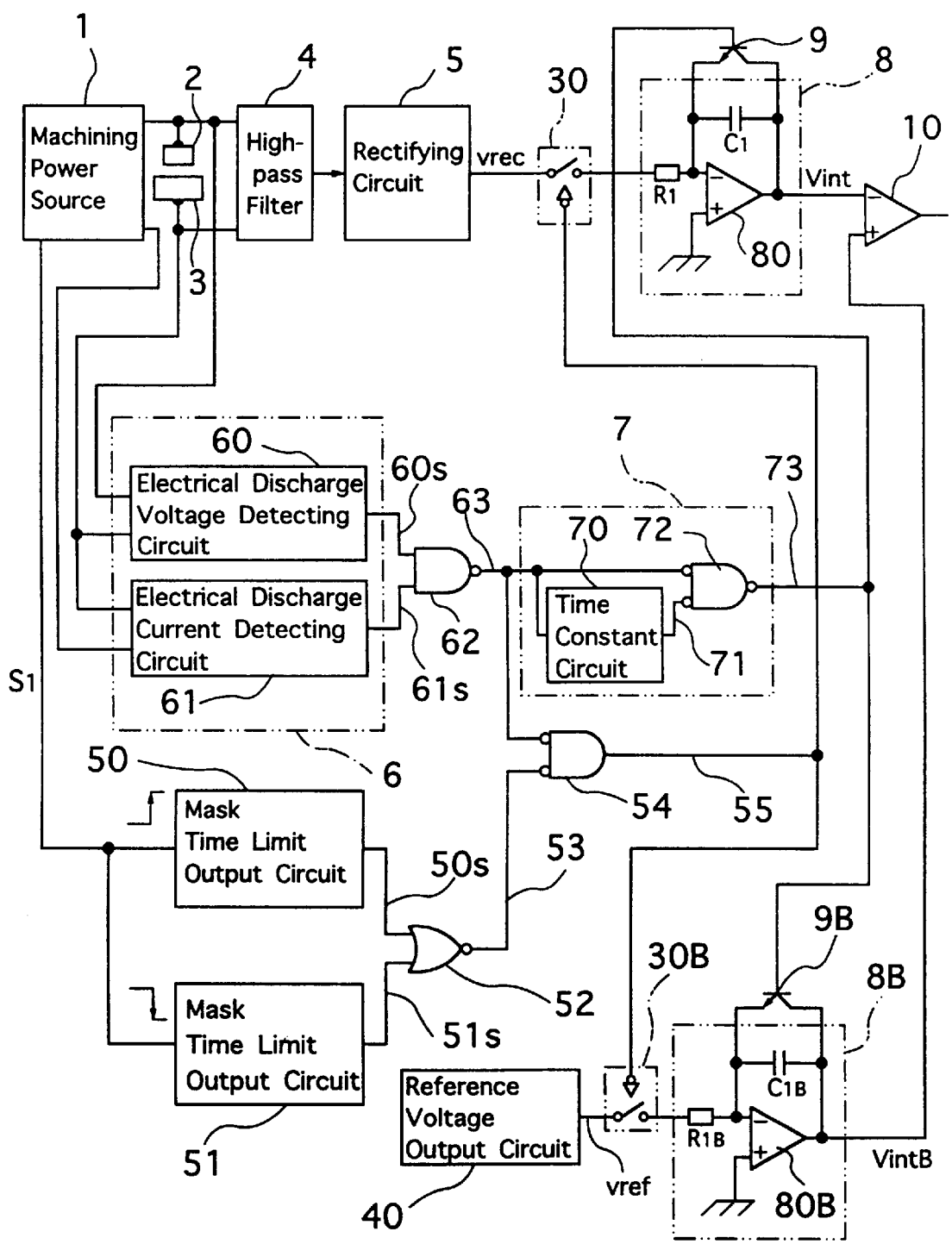
FIG. 2 is a circuit diagram showing the construction of an electrical discharge state detecting device for an electrical discharge machine in accordance with a second embodiment of the present invention.

Second Embodiment:

FIG. 2 is a circuit diagram showing the construction of the electrical discharge state detecting device for an electrical discharge machine constructed in accordance with a second embodiment of the present invention. similar structure to that of the previously described embodiment or corresponding parts are identified by the same reference numerals and characters to eliminate their detailed description. The circuit configuration for feedback control based on the output signals from the comparing circuit 10 is similar to that of the above embodiment, and its description will be omitted too.

Figure 16:
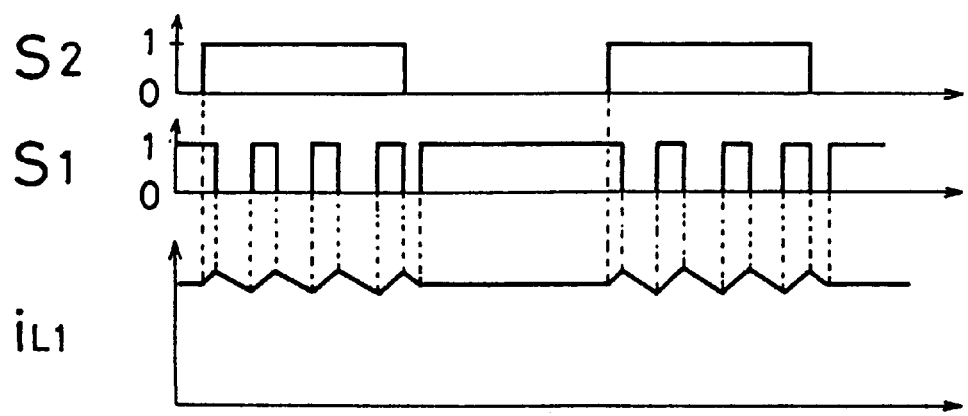
FIG. 16 is a timing chart showing input/output signal waveforms at main parts in FIG. 15.

In FIG. 2, a switch 30 is arranged between the rectifying circuit 5 and the integrating circuit 8 so as to control the inputting of the output signal vrec, which is rectified by the rectifying circuit 5, to the integrating circuit 8. In addition, a switch 30B is arranged between the reference voltage output circuit 40 and the integrating circuit 8B so as to control the inputting of the reference voltage vref from the reference voltage output circuit 40 to the integrating circuit 8B. The switches 30 and 30B have a function to stop the integrating operations of the integrating circuits 8 and 8B, which function is defined as a mask hereinafter. S1 indicates the same as S1 in FIG. 16, namely, a signal for indicating the ON/OFF state of the internal switching element for use in controlling the current of the electrical discharge power source 1. Reference numeral 50 denotes a mask time limit output circuit for outputting a mask time width m1 at the time of the ON rise of the current control switching element. Reference numeral 50s denotes its output signal. Reference numeral 51 denotes a mask time limit output circuit for outputting a mask time width m2 at the time of OFF fall of the current control switching element. Reference numeral 51s denotes its output signal. Reference numeral 52 denotes a logic circuit which outputs the output signal 53 inverted by the logic OR of the output signal 50s obtained from the mask time limit output circuit 50 and the output signal 51s obtained from the mask time limit output circuit 51. Reference numeral 54 denotes a logic circuit which outputs an output signal 55 of a logic AND of the output signal 63 obtained from the logic circuit 62 and the output signal 53 obtained from the logic circuit 52. The output signal 55 obtained from this logic circuit 54 drives the switches 30 and 30B. When the output signal 55 is at an H level, the switches 30 and 30B are turned off, and, in turn, when the output signal 55 is at an L level, the switches 30, 30B are turned on.

Figure 3:
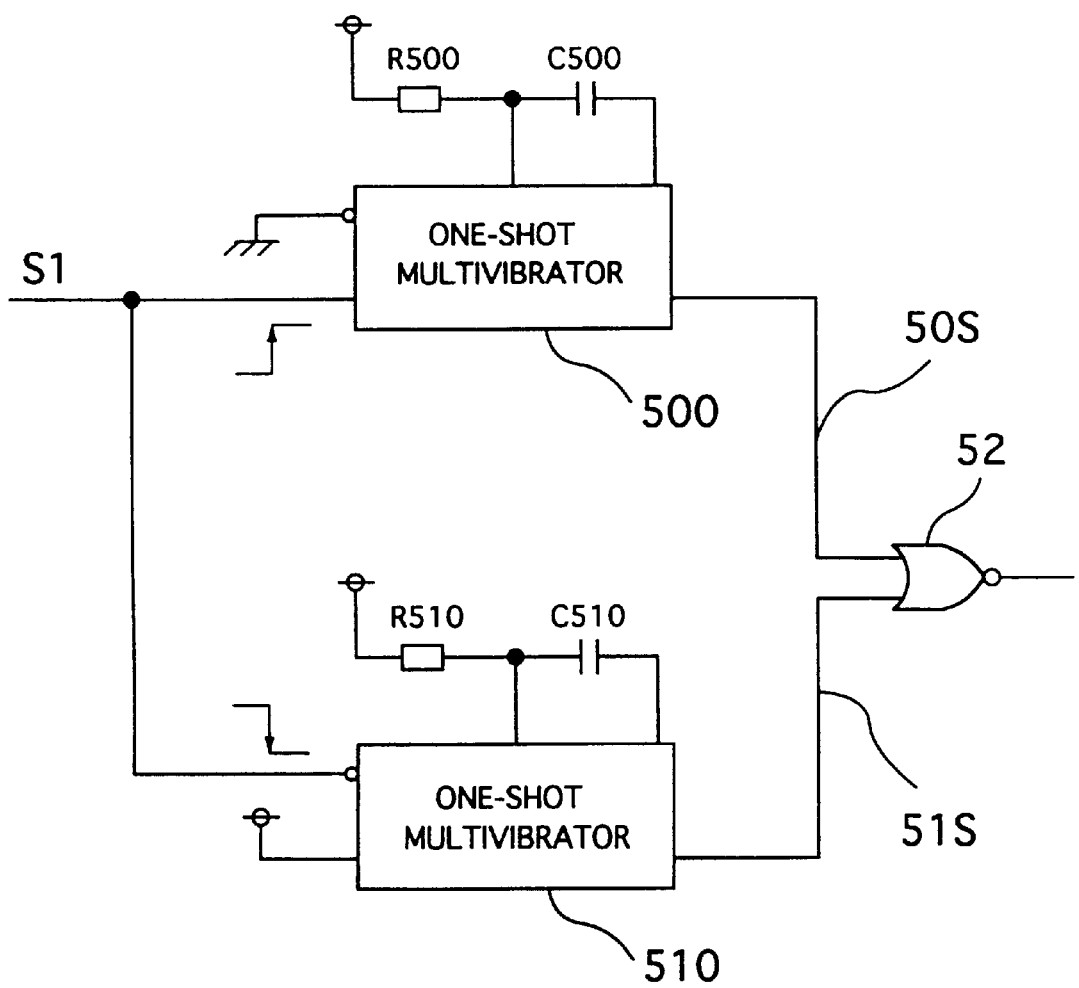
FIG. 3 is a circuit diagram showing the configuration of a mask time limit output circuit in the electrical discharge state detecting device for an electrical discharge machine in accordance with the second embodiment of the present invention.

Mask time limit output circuits 50 and 51 shown in FIG. 2 may be composed of one-shot multivibrators 500 and 510 shown in FIG. 3, for example.

The one-shot multivibrator 500 outputs a predetermined mask time width m1, which is set by a circuit constant of a resistor R500 and a capacitor C500, at the time of the ON rise of a signal S1. The one-shot multivibrator 510 outputs a predetermined mask time width m2, which is set by the circuit constant of a resistor R510 and a capacitor C510, at the time of the OFF fall of a signal S2.

Figure 4:
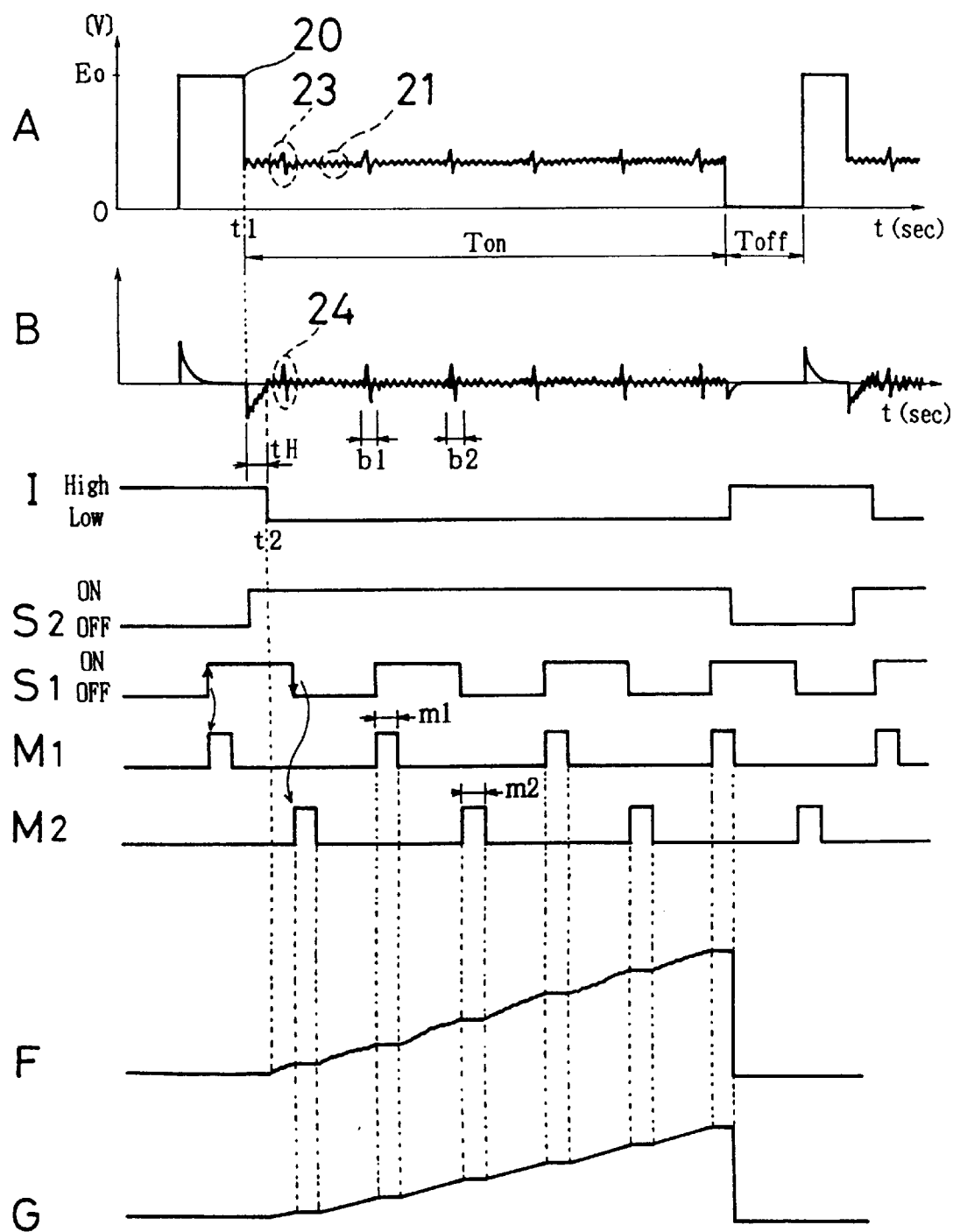
FIG. 4 is a timing chart showing input/output signal waveforms at main parts in FIG. 2.

Next, an operation is described referring to FIG. 4.

FIG. 4 is a timing chart showing input/output signal waveforms at main parts in FIG. 2.

Figure 17:
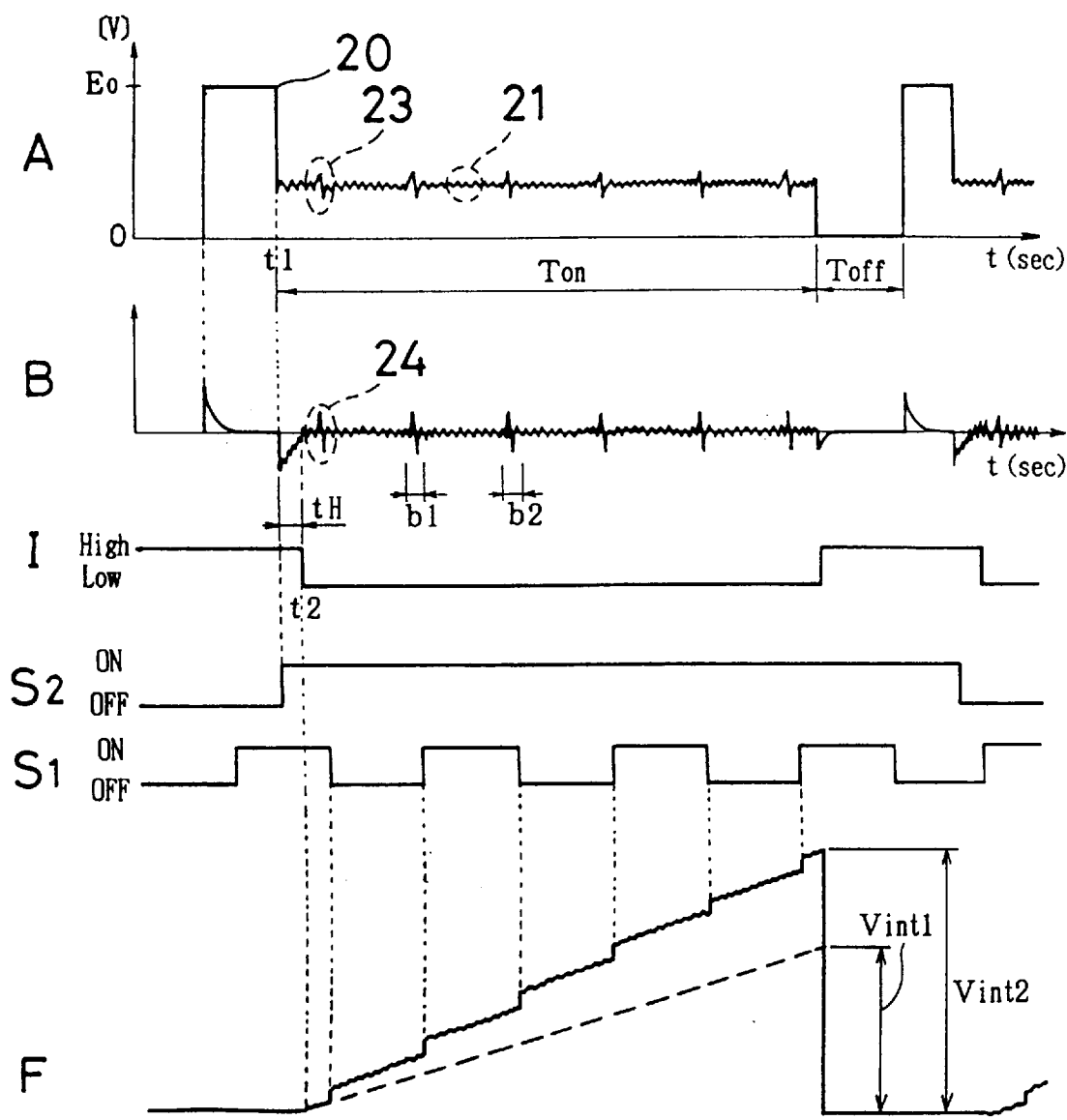
FIG. 17 is a timing chart showing input/output signal waveforms at main parts when a reactor type power source is used in the electrical discharge state detecting device for an electrical discharge machine shown in FIG. 11.

The same parts as those in FIG. 17, which indicates the input/output signal waveforms of the prior art device, or corresponding parts are identified by the same reference numerals and characters to omit their description.

Reference character A in FIG. 4 denotes an electrical discharge voltage waveform. B in FIG. 4 denotes an output signal waveform of the high-pass filter 4. I in FIG. 4 denotes the output signal waveform of the logic circuit 72. S1 in FIG. 4 denotes the output signal waveform of the internals witching element for use in controlling the electrical discharge current in the machining power source 1. M1 in FIG. 4 denotes an output signal waveform of the mask time limit output circuit 50, which outputs a mask signal having the mask time width m1 at the time of the ON rise of the internal switching element for use in controlling the electrical discharge current. M2 in FIG. 4 denotes an output signal waveform of the mask time limit output circuit 51. The mask time limit output circuit 51 outputs the mask signal having the time limit width m2 at the time of the OFF fall of the internal switching element for use in controlling the current of the machining power source 1. The mask time width m1 is set to a larger value than the time width b1 of the spike voltage 24, and the mask time width m2 is set to a larger value than the time width b2 of the spike voltage 24. Reference character F in FIG. 4 denotes the output waveform obtained by integrating, over time, the output signal vrec from the rectifying circuit 5 through the integrating circuit 8. Reference character G in FIG. 4 denotes an output waveform obtained by integrating, over time, the reference signal vref from the reference voltage output circuit 40 by the integrating circuit 8. Integrating operations of the integrating circuits 8 and 8B are stopped during the mask time widths m1 and m2 and the integrated waveform keeps its value during these time widths.

As apparent from F in FIG. 4, influence of the spike voltage 24 is completely eliminated and there is no erroneous detection as shown by Vint2 in F in FIG. 17. The integrating operation for the reference voltage is also stopped during the integrating operation for the rectified output is stopped, and there is no error in deciding if it is a normal electrical discharge pulse or an abnormal electrical discharge pulse such as an arc electrical discharge pulse at the stage of judgment by the comparator 10.

The present embodiment of the electrical discharge state detecting device for an electrical discharge machine thus comprises: the high-frequency component detecting means including the high-pass filter 4 for detecting a high-frequency component superimposed on either an electrical discharge voltage or an electrical discharge current at the machining clearance between the electrode 2 and the workpiece 3; the rectifying means including the rectifying circuit 5 for outputting the rectifying component vrec obtained by rectifying the high-frequency component detected by the high-frequency component detecting means; the first integrating means including the integrating circuit 8 for integrating, over time, the magnitude of the rectified component vrec outputted from the rectifying means; the reference voltage output means including the reference voltage output circuit 40 for outputting the reference voltage vref; the second integrating means including the integrating circuit 8B for integrating, over time, the magnitude of the reference voltage vref outputted from the reference voltage output means; the integration stopping means, including the mask time limit output circuits 50 and 51, logic circuits 52 and 54 and switches 30 and 30B, for stopping the integrations in the first integrating means and second integrating means only for the predetermined times m1 and m2 on the basis of the ON time and OFF time of the internal switching element for use in controlling current in the machining power source 1; the control means, including the electrical discharge generation detecting circuit 6, logic circuit 62, delay circuit 7 and reset circuits 9 and 9B, for controlling a starting and an ending of the integrations in the first integrating means and second integrating means; and the comparing means including the comparator 10 for comparing the integrated value Vint obtained by the first integrating means and the integrated value VintB obtained by the second integrating means, which are controlled by the controlling means.

Accordingly, the high-pass filter 4 detects the high-frequency component superimposed on either the electrical discharge voltage or the electrical discharge current at the machining clearance between the electrode 2 and the workpiece 3. The high-frequency component is rectified by the rectifying circuit 5, and the magnitude of the outputted rectified component vrec is integrated, over time, by the integrating circuit 8. The magnitude of the reference voltage vref outputted from the reference voltage output circuit 40 is integrated, over time, by the integrating circuit 8B. Utilizing the mask time limit output circuits 50 and 51, and the logic circuits 52 and 54 and switches 30 and 30B, the integrations in the integrating circuit 8 and integrating circuit 8B are stopped only for the predetermined times m1 and m2 on the basis of the operations at the ON time and OFF time of the internal switching element for use in controlling current in the machining power source 1. The starting and ending of the integrations in the integrating circuit 8 and integrating circuit 8B are controlled by the electrical discharge generation detecting circuit 6, logic circuit 62, delay circuit 7 and reset circuits 9 and 9B. The integrated value Vint obtained by the integrating circuit 8 and the integrated value VintB obtained by the integrating circuit 8B are compared to each other with the comparator 10.

Accordingly, the integrating operation is stopped only for the predetermined times m1 and m2 synchronously with the operation of the internal switching element for use in controlling current in the machining power source 1, so that the influence of disturbances can be eliminated and accurate detecting of the electrical discharge state can be attained.

Figure 5:
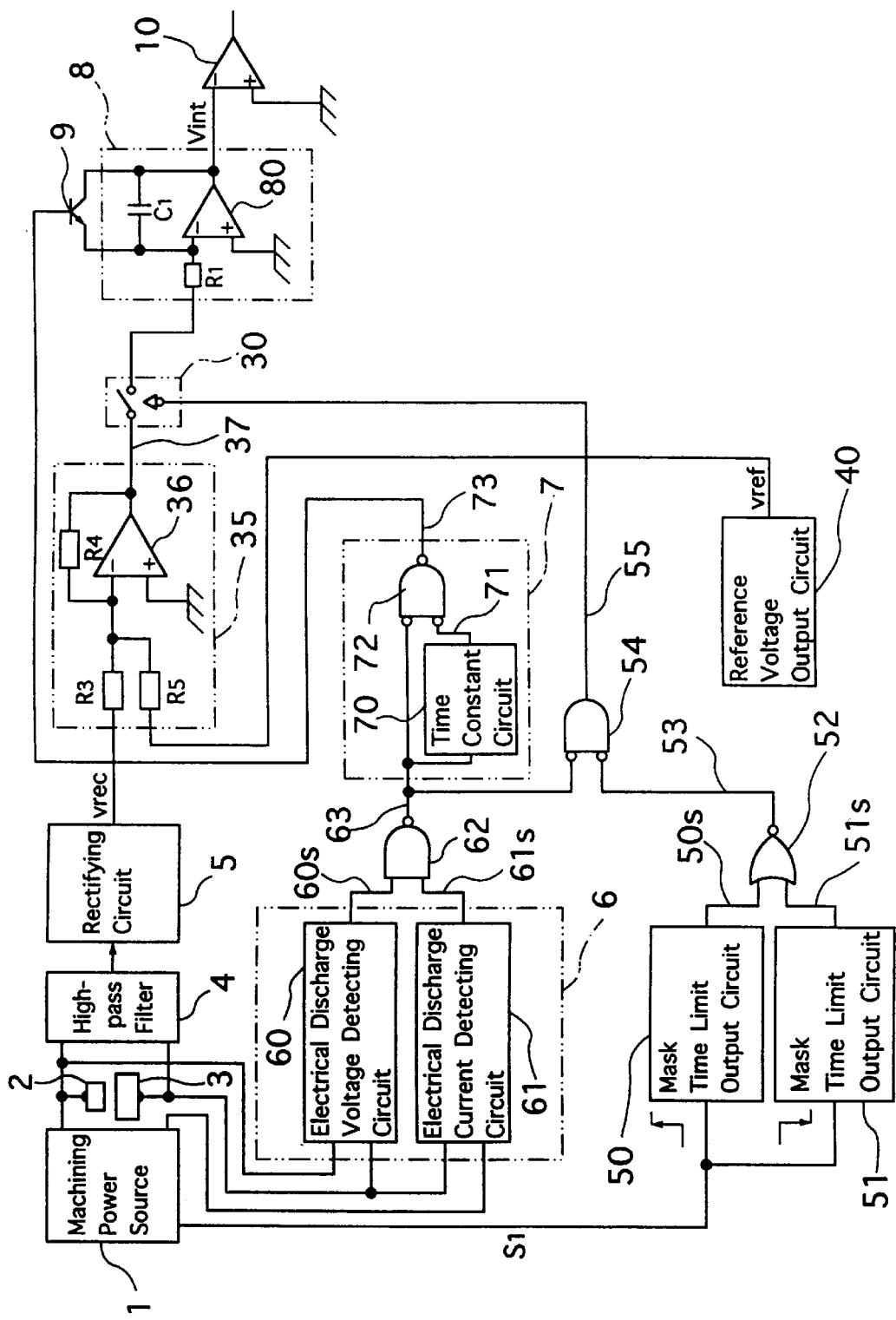
FIG. 5 is a circuit diagram showing the construction of an electrical discharge state detecting device for an electrical discharge machine in accordance with a third embodiment of the present invention.

Third Embodiment:

FIG. 5 is a circuit diagram showing the construction of the electrical discharge state detecting device for an electrical discharge machine constructed in accordance with a third embodiment of the present invention. The construction similar to that of the previously embodiments or corresponding portions are identified with the same reference numerals and characters, thereby omitting their detailed description.

The circuit configuration for feedback control based on the output signals from the comparing circuit 10 is similar to that of the above embodiment, and hence a further description will be omitted.

In FIG. 5, reference numeral 35 denotes a difference circuit for outputting an output signal 37, which is a difference component between the output signal vrec from the rectifying circuit 5 and the reference voltage vref from the reference voltage output circuit 40. The output signal 37 from the difference circuit 35 is cut off from the integrating circuit 8 after the switch 30 is operated only for the mask time widths m1 and m2 as in the second embodiment, thereby to cause the integrating operation in the integrating circuit 8 to be stopped.

In this case, in the second embodiment, the value Vint, which is obtained by integrating, over time, the output signal vrec from the rectifying circuit 5, and the value VintB, which is obtained by integrating, over time, the reference voltage vref from the reference voltage output circuit 40, are compared to each other by the comparator 10. Then, it is judged if the discharge pulse is a normal electrical discharge pulse or an abnormal electrical discharge pulse such as an arc electrical discharge pulse. Thus, it is necessary to provide the switches 30 and 30B, integrating circuits 8 and 8B and reset circuits 9 and 9B, i.e., two of each type of switch. To the contrary, in the present embodiment, the difference between the output signal vrec from the rectifying circuit 5 and the reference voltage vref from the reference voltage output circuit 40 is integrated, over time, and, lastly, it is compared with a value 0 by the comparator 10. Then, it is judged if it is a normal electrical discharge pulse or an abnormal electrical discharge pulse such as an arc electrical discharge pulse. That is, in the present embodiment, it is possible to accomplish the judgment similar to that of the second preferred embodiment using only one switch 30, one integrating circuit 8 and one reset circuit 9.

As described above, the present embodiment of the electrical discharge state detecting device for an electrical discharge machine comprises: the high-frequency component detecting means including the high-pass filter 4 for detecting the high-frequency component superimposed on either an electrical discharge voltage or an electrical discharge current at the machining clearance between the electrode 2 and the workpiece 3; the rectifying means including the rectifying circuit 5 for outputting the rectified component vrec obtained by rectifying the high-frequency component detected by the high-frequency component detecting means; the reference voltage output means including the reference voltage output circuit 40 for outputting the reference voltage vref; the difference output means including the difference circuit 35 for outputting a difference between the rectified component vrec outputted from the rectifying means and the reference voltage vref outputted from the reference voltage output means; the integrating means including the integrating circuit 8 for integrating the difference outputted from the difference output means; the integration stopping means, including the mask time limit output circuits 50 and 51, logic circuits 52 and 54 and switch 30, for stopping integration in the integrating means only for the predetermined times m1 and m2 on the basis of the ON time and OFF time of the internal switching element for use in controlling current in the machining power source 1; the control means, including the electrical discharge generation detecting circuit 6, logic circuit 62, delay circuit 7 and reset circuit 9, for controlling starting and ending of the integrating means; and the comparing means including the comparator 10 for comparing the integrated value Vint obtained by said integrating means and the reference value 0, which are controlled by the controlling means.

The high-pass filter 4 detects the high-frequency component superimposed on either the electrical discharge voltage or the electrical discharge current at the machining clearance between the electrode 2 and the workpiece. The high-frequency component is rectified by the rectifying circuit 5, and the difference between the outputted rectified component vrec and the reference voltage vref outputted from the reference voltage output circuit 40 is integrated over time by the integrating circuit 8. The mask time limit output circuits 50 and 51, logic circuits 52 and 54 and switch 30 operate to stop the integration in the integrating circuit 8 only for the predetermined times m1 and m2 on the basis of the ON time and OFF time of the internal switching element for use in controlling current of the machining power source 1. Here, the starting and ending of the integration in the integrating circuit 8 are controlled by the electrical discharge generation detecting circuit 6, logic circuit 62, delay circuit 7 and reset circuit 9. Then, the integrated value Vint obtained by the integrating circuit 8 and the reference value 0 are compared by the comparator 10.

Consequently, the difference between the rectified component vrec of the high-frequency component and the reference voltage vref is integrated over time, so that the number of the integrating circuit 8 and the switches 30 for stopping the integration only for the predetermined times m1 and m2 is reduced and the circuit configuration can be simplified.

Figure 6:
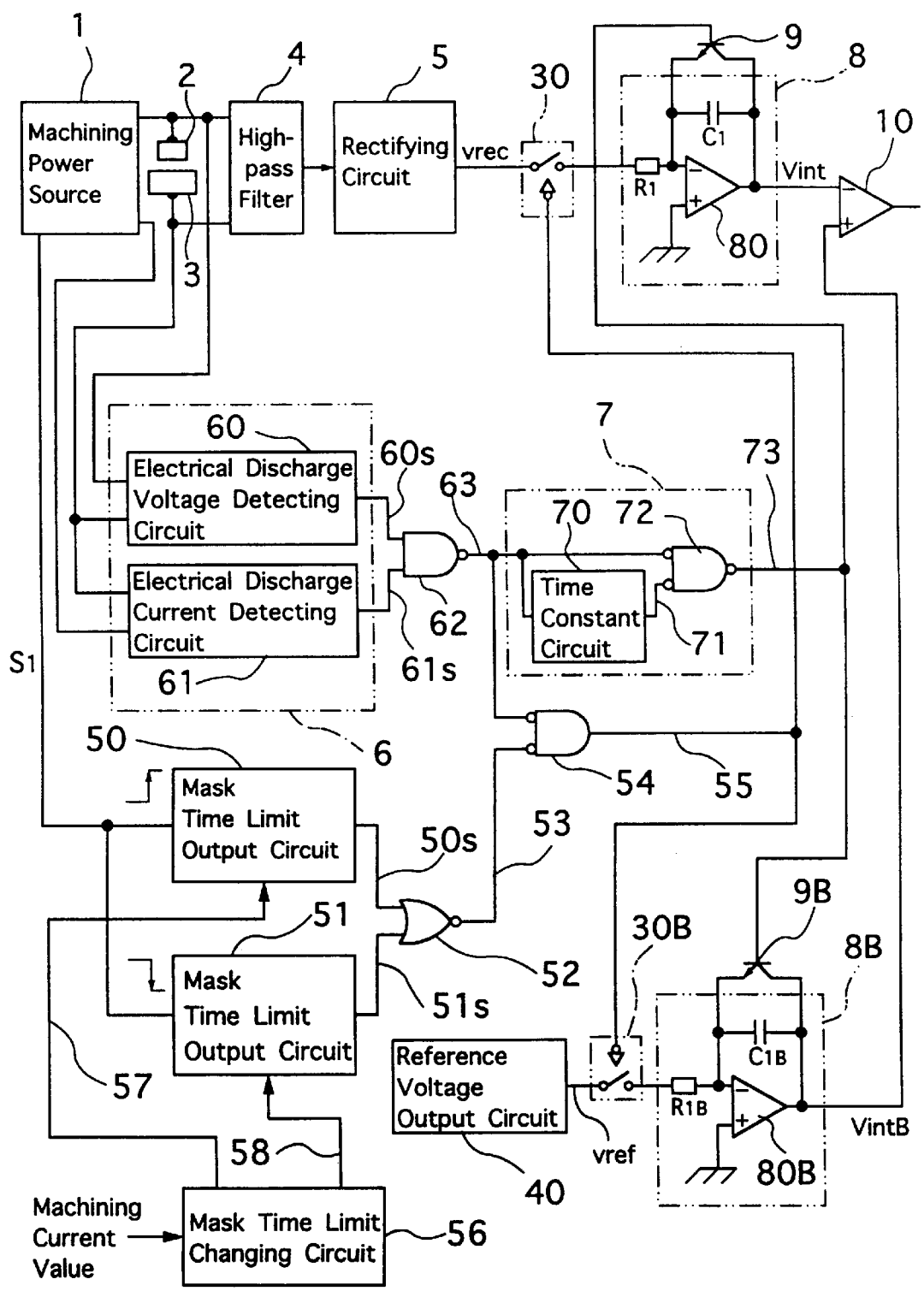
FIG. 6 is a circuit diagram showing the configuration of an electrical discharge state detecting device of an electrical discharge machine in accordance with a fourth embodiment of the present invention.

Fourth Embodiment:

FIG. 6 is a circuit diagram showing a configuration of the electrical discharge state detecting device for an electrical discharge machine in accordance with a fourth embodiment of the present invention. In FIG. 6, a mask time limit changing circuit 56 is added to the second embodiment of FIG. 2. The same configuration as that of the aforesaid embodiment or corresponding portions are identified by the same reference characters and numerals, thereby omitting their detailed description.

The circuit configuration for feedback control based on the output signals from the comparing circuit 10 is similar to that of the above embodiment, and thus a further description will be omitted.

In FIG. 6, it is known that the time widths b1 and b2 of the spike voltage 24 indicated by the character B in FIG. 4 depend on the machining current value. The mask time limit changing circuit 56 having the machining current value read therein outputs the output signals 57 and 58. Each of these output signals 57 and 58 is inputted to each of the mask time limit output circuits 50 and 51. For example, when the machining current value is high, the mask time width m1 of the mask time limit output circuit 50 is increased based on the output signal 57 from the mask time limit changing circuit 56. In turn, when the machining current value is low, the mask time width m2 of the mask time limit output circuit 51 is reduced based on the output signal 58 from the mask time limit changing circuit 56.

Figure 8:
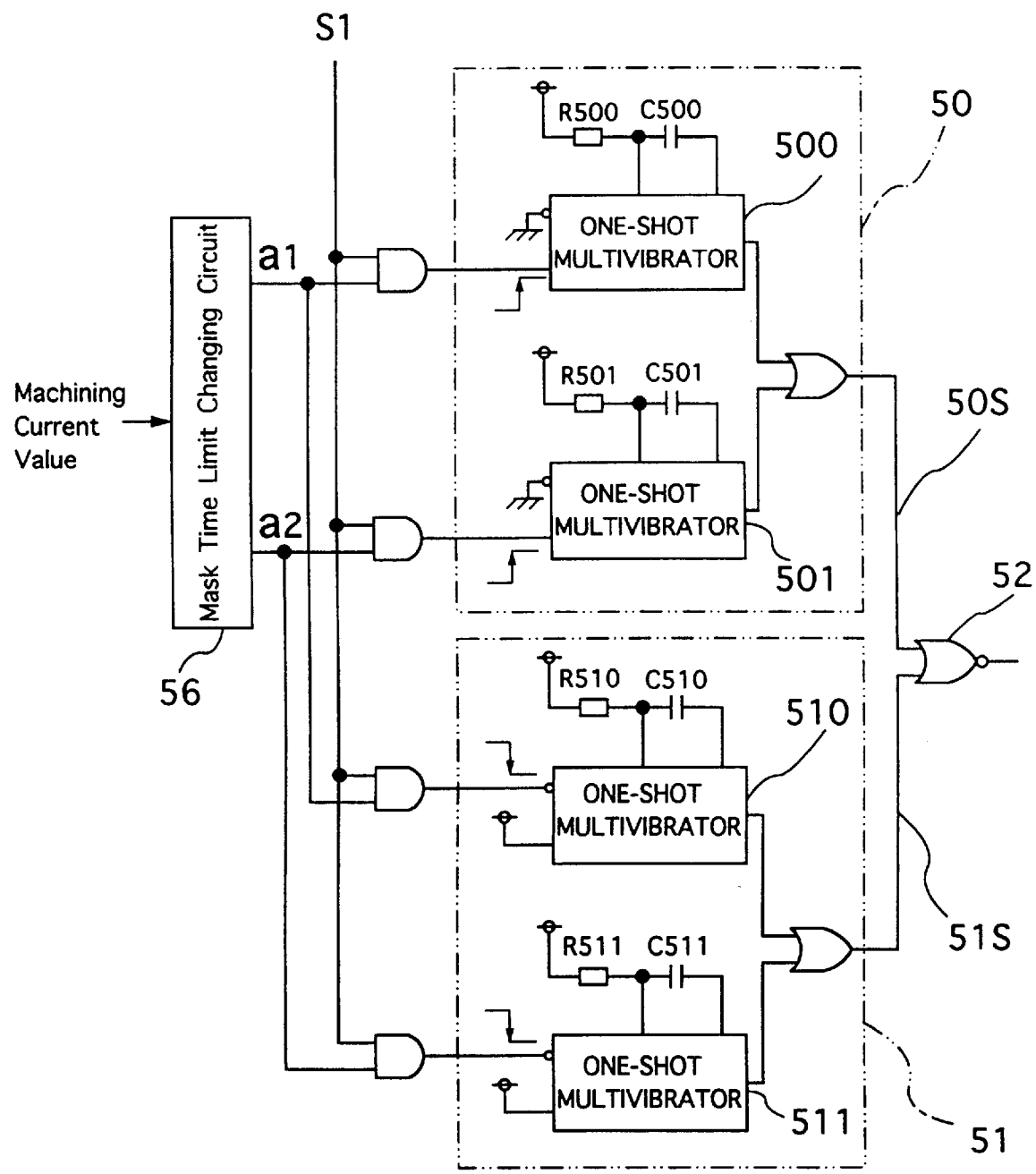
FIG. 8 is a circuit diagram showing the configuration of a mask time limit output circuit in the electrical discharge state detecting device of an electrical discharge machine in accordance with a fourth embodiment of the present invention.

The mask time limit changing circuit 56 and the mask time limit output circuits 50 and 51 are described referring to FIGS. 7 and 8. FIG. 7 is a data table showing a machining current value, which is obtained by the mask time limit output circuit, and a time width changing signal corresponding to the mask time width. FIG. 8 is a circuit diagram showing a configuration of the mask time limit output circuit.

The mask time limit changing circuit 56 outputs time width changing signals a1 and a2, as output signals 57 and 58 shown in FIG. 6, in accordance with the mask time widths m1 and m2 corresponding to the machining current value at that time, while using the data table shown in FIG. 7. For example, the time width changing signal a1 is outputted corresponding to a machining current value of 1 to 20 Ampere (A), and the time width changing signal a2 is outputted corresponding to a machining current value of 21 to 80 (A).

These time changing signals a1 and a2 are outputted to the mask time limit output circuit 50, as shown in FIG. 8. The mask time limit output circuit 50 is composed of one-shot multivibrators 500 and 501, and the mask time limit output circuit 51 is composed of one-shot multivibrators 510 and 511. The one-shot multivibrator 500 sets the mask time width m1, which is a circuit constant determined by a resistor R500 and a capacitor C500 (e.g., 2 $\mu$s), and outputs the mask time width of 2 $\mu$s at the time of ON rise of the signal S1. The one-shot multivibrator 501 sets the mask time width m1, which is a circuit constant determined by a resistor R501 and a capacitor C501 (e.g., at 8 $\mu$s), and outputs the mask time width of 8 $\mu$s at the time of ON rise of the signal S1. The one-shot multivibrator 510 sets the mask time width m2, which is a circuit constant determined by a resistor R510 and a capacitor C510 (e.g., 4 $\mu$s), and outputs the mask time width of 4 $\mu$s at the time of OFF fall of the signal S1. The one-shot multivibrator 511 sets the mask time width m2, which is a circuit constant determined by a resistor R511 and a capacitor C511 (e.g., 10 $\mu$s), and outputs the mask time width of 10 $\mu$s at the time of the OFF fall of the signal S1.

As described above, the present embodiment of the electrical discharge state detecting device for an electrical discharge machine comprises: the high-frequency component detecting means including the high-pass filter 4 for detecting the high-frequency component superimposed on either an electrical discharge voltage or an electrical discharge current at the machining clearance between the electrode 2 and the workpiece 3; the rectifying means including the rectifying circuit 5 for outputting the rectified component vrec obtained by rectifying the high-frequency component detected by the high-frequency component detecting means; the first integrating means including the integrating circuit 8 for integrating, over time, the magnitude of the rectified component vrec outputted from the rectifying means; the reference voltage outputting means including the reference voltage output circuit 40 for outputting the reference voltage vref; the second integrating means including the integrating circuit 8B for integrating, over time, the magnitude of the reference voltage vref outputted from the reference voltage output means; the integration stopping means, including the mask time limit output circuits 50 and 51, logic circuits 52 and 54 and switches 30 and 30B, for stopping integration in the first integrating means and second integrating means only for the predetermined times m1 and m2 on the basis of the ON time and OFF time of the internal switching element for use in controlling current in the machining power source 1; the time changing means including the mask time limit changing circuit 56 for changing the durations of the predetermined times m1 and m2, during which the integration is stopped by the integration stopping means, in accordance with a magnitude of the machining current value; the control means, including the electrical discharge generation detecting circuit 6, logic circuit 62, delay circuit 7 and reset circuits 9 and 9B, for controlling starting and ending of the integrations by the first integrating means and second integrating means; and the comparing means including the comparator 10 for comparing the integrated value Vint obtained by the first integrating means and the integrated value VintB obtained by the second integrating means, which are controlled by the controlling means.

Accordingly, the high-pass filter 4 detects the high-frequency component superimposed on either the electrical discharge voltage or the electrical discharge current at the machining clearance between the electrode 2 and the workpiece 3. The high-frequency component is rectified by the rectifying circuit 5, and the magnitude of the outputted rectified value vrec is integrated over time by the integrating circuit 8. In addition, the magnitude of the reference voltage vref outputted from the reference voltage output circuit 40 is integrated over time by the integrating circuit 8B. Utilizing the mask time limit output circuits 50 and 51, logic circuits 52 and 54 and switches 30 and 30B, integrations in the integrating circuit 8 and the integrating circuit 8B are stopped only for the predetermined times m1 and m2 on the basis of the ON time and OFF time of the internal switching element for use in controlling current in the machining power source 1. In the mask time limit changing circuit 56, the durations of the predetermined times m1 and m2, during which the integrations are stopped by the mask time limit output circuits 50 and 51, logic circuits 52 and 54 and switches 30 and 30B, are changed in accordance with the magnitude of the machining current value. Here, starting and ending of the integrations by the integrating circuit 8 and integrating circuit 8B are controlled by the electrical discharge generation detecting circuit 6, logic circuit 62, delay circuit 7 and reset circuits 9 and 9B. Then, the integrated value Vint obtained by the integrating circuit 8 is compared with the integrated value VintB obtained by the integrating circuit 8B by the comparator 10.

Consequently, the durations of the predetermined times m1 and m2 of the mask time limit are changed in accordance with a magnitude of the machining current, so that influence of disturbances can be surely eliminated and accurate detecting of the electrical discharge state can be attained.

Figure 9:
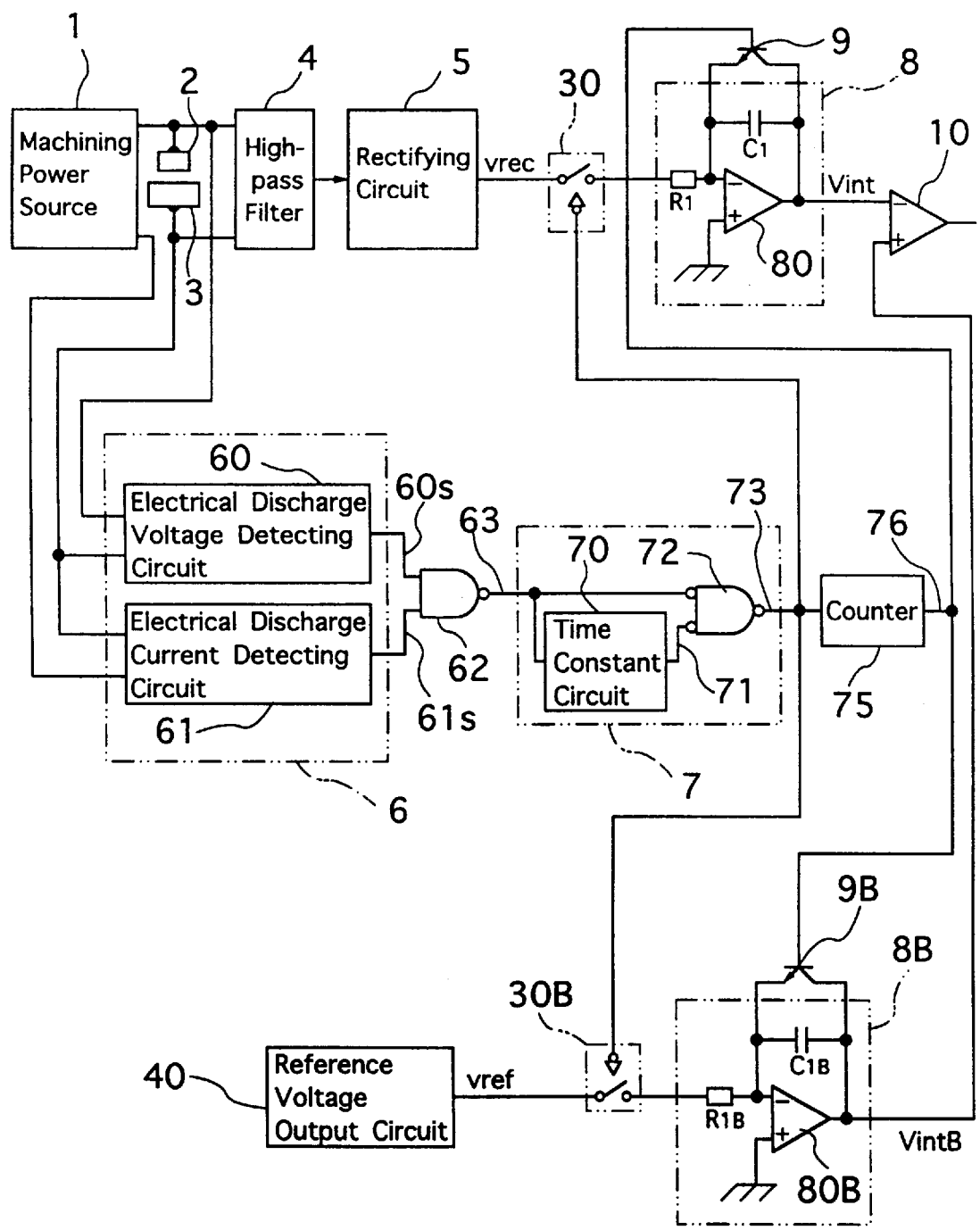
FIG. 9 is a circuit diagram showing the configuration of an electrical discharge state detecting device for an electrical discharge machine in accordance with a fifth embodiment of the present invention.
Figure 10:
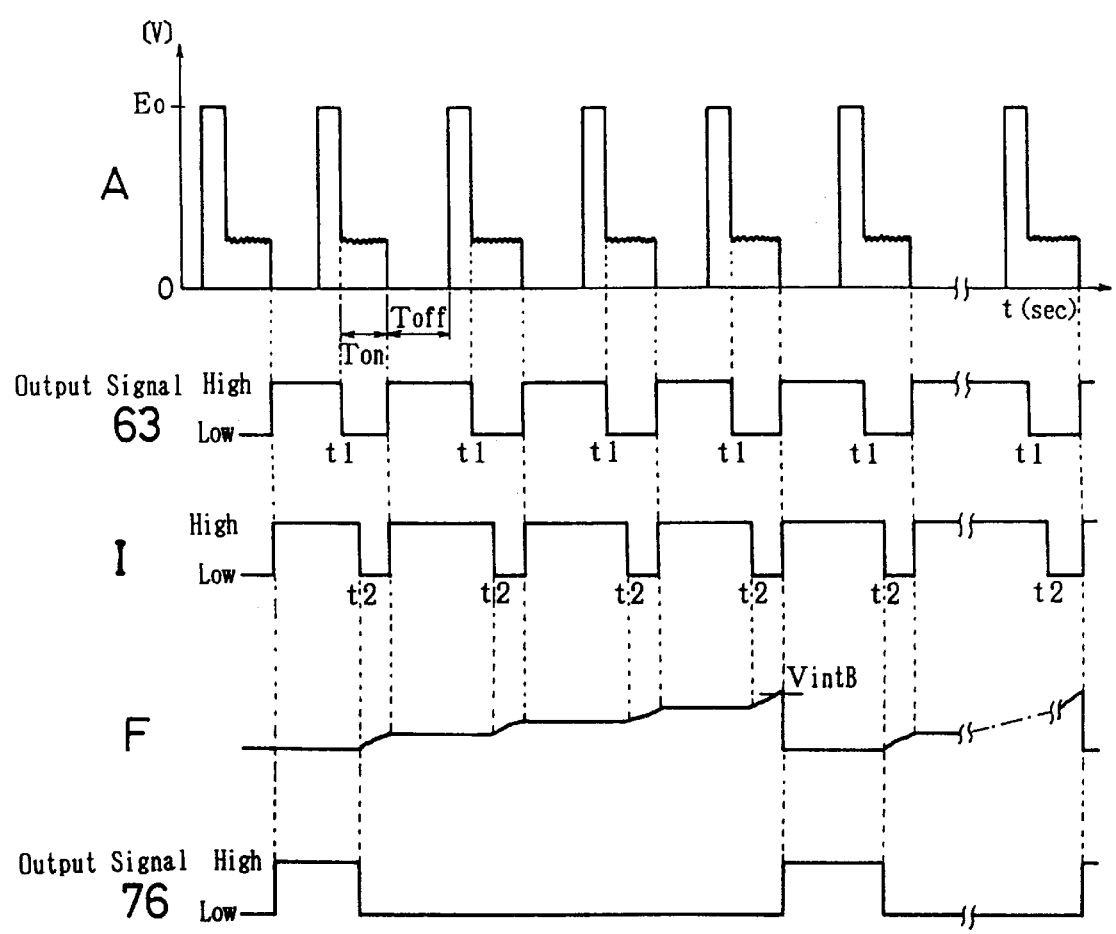
FIG. 10 is a timing chart showing input/output signal waveforms at main parts in FIG. 9.

Fifth Embodiment:

FIG. 9 is a circuit diagram showing the configuration of the electrical discharge state detecting device for an electrical discharge machine in accordance with a fifth embodiment of the present invention. FIG. 10 is a timing chart showing input/output signal waveforms at main parts in FIG. 9. The same configurations as those of the previously described embodiments or corresponding portions are identified by the same reference numerals and characters, and their further detailed description is omitted. The circuit configuration for feedback control based on the output signals from the comparing circuit 10 is similar to that of the above-described embodiment, and its further description too will be omitted.

In the prior art device, in case the electrical discharge pulse width Ton in the electrical discharge voltage waveform at the machining clearance between the electrode 2 and the workpiece 3 is small, as indicated by A in FIG. 10, the integration period per electrical discharge pulse is short, so that the integrated output of the high-frequency component becomes so low that sufficiently accurate detecting of the high-frequency component becomes difficult.

In view of this fact, the electrical discharge state detecting device for an electrical discharge machine of the present embodiment is constructed as shown in FIG. 9.

Reference numeral 30 denotes a switch for separating the rectifying circuit 5 from the integrating circuit 8. Reference numeral 30B denotes a switch for separating the reference voltage output circuit 40 from the integrating circuit 8B. Reference numeral 75 denotes a counter for counting the number of pulses in reference character I in FIG. 10, which is an output signal waveform of the output signal 73 from the logic circuit 72. The output signal from the counter 75 is inputted to the reset circuit 9. Then, for example, as shown by the output signal 76 from the counter 75 in FIG. 10, if the number of counted pulses of the output signal 73 from the logic circuit 72 reaches four, the output signal 76 becomes an H level. During the output signal 73 from the logic circuit 72 is at the H level, the switches 30 and 30B are turned off, and the integrating circuits 8 and 8B are separated from the rectifying circuit 5 and the reference voltage output circuit 40, so that the integrating operations of the integrating circuits 8 and 8B are stopped, thereby holding the integrated output value. When the counter 75 counts the output signals 73 from the logic circuits 72 corresponding to four electrical discharge pulses, the output signal 76 from the counter 75 becomes the H level. Then, the reset circuits 9 and 9B reset the integrated output value of the integrating circuits 8 and 8B. That is, in FIGS. 9 and 10, the high-frequency components corresponding to four electrical discharge pulses are integrated over time, and the comparator 10 compares the integrated output Vint with the integrated output VintB, which is obtained by integrating, over time, the reference voltage vref from the reference voltage output circuit 40 by the integrating circuit 8B only for the same time period, at the time of completion of the fourth electrical discharge pulse. According to such a configuration, it is satisfactory that the switch 30, counter 75 and integrating circuit 8B be added to the prior art device shown in FIG. 11.

As described above, the present embodiment of the electrical discharge state detecting device for an electrical discharge machine comprises: the high-frequency component detecting means including the high-pass filter 4 for detecting the high-frequency component is superimposed on either the electrical discharge voltage or the electrical discharge current at the machining clearance between the electrode 2 and the workpiece 3; the rectifying means including the rectifying circuit 5 for outputting the rectified component vrec obtained by rectifying the high-frequency component detected by the high-frequency component detecting means; the count means including the counter 75 for counting a plurality of continual electrical discharge pulses; the first integrating means including the integrating circuit 8 for integrating, over time, the magnitude of the rectified component vrec outputted from the rectifying means and adding them only for the number of electrical discharge pulses counted by the count means; the reference voltage output means including the reference voltage output circuit 40 for outputting the reference voltage vref; the second integrating means including the integrating circuit 8B for integrating, over time, the magnitude of the reference voltage vref outputted from the reference voltage output means and adding them only for the number of electrical discharge pulses counted by the count means; the control means, including the electrical discharge generation state detecting circuit 6, logic circuit 62, delay circuit 7 and reset circuits 9 and 9B, for controlling a starting and an ending of integrations in the first integrating means and second integrating means; and the comparing means including the comparator 10 for comparing the integrated value Vint obtained by the first integrating means and the integrated value VintB obtained by the second integrating means, which are controlled by the controlling means.

Accordingly, the high-pass filter 4 detects the high-frequency component superimposed on the electrical discharge voltage or the electrical discharge current at the machining clearance between the electrode 2 and the workpiece 3. The high-frequency component is rectified by the rectifying circuit 5, and the magnitude of the outputted rectifying component vrec is integrated over time by the integrating circuit 8 and added only for a plurality of continual discharge pulses counted by the counter 75. Then, the magnitude of the reference voltage vref outputted from the reference voltage output circuit 40 is integrated over time by the integrating circuit 8B and added only for a plurality of continual discharge pulses counted by the counter 75. Here, the starting and ending of the integrations in the integrating circuit 8 and integrating circuit 8B are controlled by the electrical discharge generation detecting circuit 6-, logic circuit 62, delay circuit 7 and reset circuits 9 and 9B. Then, the integrated value Vint obtained by the integrating circuit 8 is compared with the integrated value VintB obtained by the integrating circuit 8B by the comparator 10.

Consequently, the high-frequency component for a plurality of continual electrical discharge pulses is integrated over time, so that an electrical discharge state can be sensed accurately even when the electrical discharge pulse width Ton is small.

While the high-frequency component detecting means of each of the aforesaid embodiments uses the high-pass filter, the present invention is not limited to this in practice, and any device may be used as long as it detects the high-frequency component of the electrical discharge voltage or the electrical discharge current at the machining clearance between the electrode and the workpiece. For example, a similar effect can be attained in case of using a bandpass filter having high-pass filtering characteristic for detecting the high-frequency component and cutting off a region of a frequency higher than that.

While detecting of the high-frequency component of the electrical discharge voltage waveform has been described in each of the aforesaid embodiments, it is apparent that the present invention can be applied to a high-frequency component of an electrical discharge current waveform or an impedance waveform at the machining clearance.

It is also apparent that, while the preferred embodiment is described with reference to a hardware implementation, it can implemented as well in a software configuration.

In addition, while each of the aforesaid preferred embodiments is realized in a shape-forming electrical discharge machine, the present invention is not limited to this in practice, and it is apparent, for instance, that the present invention can be applied also to a wire cutting electrical discharge machine.

As described above, according to the electrical discharge state detecting device for an electrical discharge machine of the first embodiment, the high-frequency component, which is superimposed on either the electrical discharge voltage or the electrical discharge current at the working clearance between the electrode and the workpiece, is detected by the high-frequency component detecting means. The magnitude of the high-frequency component is subjected to time-integration in the first integrating means. In addition, the magnitude of the reference voltage outputted from the reference voltage output means is subjected to time-integration in the second integrating means. Here, the starting and ending of the integrations in the first integrating means and second integrating means are controlled by the controlling means. Then, the integrated value obtained by the first integrating means is compared with the is integrated value obtained by the second integrating means through the comparing means. In this way, the reference voltage is integrated by the second integrating means, and the integrated value is employed as the comparison value for judging whether or not the electrical discharge state of the electrical discharge machine is a normal electrical discharge pulse or an abnormal electrical discharge pulse such as an arc electrical discharge pulse. Thus, it is possible to carry out precise setting of the reference value.

The magnitude of the high-frequency component, which is subjected to time-integration in the first integrating means is the magnitude of the rectified component obtained by rectifying the high-frequency component. Thus, it is possible to make the amount of variation of the integrated value smaller since the magnitude of the rectified component, obtained by rectifying the high-frequency component, is integrated over time. Therefore, it is possible to correctly judge if it is a normal electrical discharge pulse or an abnormal electrical discharge pulse such as an arc electrical discharge pulse.

According to the electrical discharge state detecting device for an electrical discharge machine of the second embodiment, the high-frequency component, which is superimposed on either the electrical discharge voltage or the electrical discharge current at the working clearance between the electrode and the workpiece, is detected by the high-frequency component detecting means. The high-frequency component is rectified by the rectifying means, and the magnitude of the outputted rectified component is integrated over time by the first integrating means. In addition, the magnitude of the reference voltage outputted from the reference voltage output means is integrated over time by the second integrating means. The integrations in the first integrating means and second integrating means are stopped by the integration stopping means only for a predetermined period of time on the basis of an operation of the internal switching element for use in controlling current in the machining power source. The predetermined period of time is set to the time duration of the spike voltage generated at this time, and error factors of the integrated value are eliminated by stopping integration as above. Here, the starting and ending of the first integrating means and second integrating means are controlled by the control means. Then, the integrated value from the first integrating means is compared with the integrated value from the second integrating means through the comparing means. In this way, the integrating operation is stopped only for a predetermined period of time synchronous with the operation of the internal switching element for use in controlling current in the machining power source, so that it is possible to eliminate influence of disturbances and to perform accurate detection of the electrical discharge state.

According to the electrical discharge state detecting device for an electrical discharge machine of the third embodiment, the high-frequency component, which is superimposed on either the electrical discharge voltage or the electrical discharge current at the machining clearance between the electrode and the workpiece, is detected by the high-frequency component detecting means. The high-frequency component is rectified by the rectifying means, and the difference between the outputted rectified component and the reference voltage outputted from the reference voltage outputting means is outputted from the difference voltage outputting means and is integrated over time by the integrating means. The integration in the integrating means is stopped by the integration stopping means only for a predetermined period of time on the basis of an operation of the internal switching element for use in controlling current in the machining power source. The predetermined period of time is set to a time duration of the spike voltage generated at this time, and error factors of the integrated value are eliminated by stopping the integration as above. Here, the starting and stopping of the integrating means are controlled by the control means. Then, the integrated value of the integrating means is compared with the reference value 0 through the comparing means. In this way, the difference between the rectified component of the high-frequency component and the reference voltage is integrated over time and compared with the reference value, so that it is possible to reduce the number of the integrating means and the integration stopping means for stopping the integration only for a predetermined period of time, thereby simplifying a circuit configuration.

According to the electrical discharge state detecting device for an electrical discharge machine of the fourth embodiment, the high-frequency component, which is superimposed on either the electrical discharge s voltage or the electrical discharge current at the machining clearance between the electrode and the workpiece, is detected at the high-frequency component detecting means. The high-frequency component is rectified by the rectifying means, and the magnitude of the outputted rectified component is integrated over time by the first integrating means. The magnitude of the reference voltage outputted from the reference voltage output means is integrated over time by the second integrating means. The integrations in the first integrating means and second integrating means are stopped by the integration stopping means only for a predetermined period of time on the basis of an operation of the internal switching element for use in controlling current in the machining power source. The duration of the predetermined period of time, for which the integrations are stopped by the integration stopping means, is changed by the time changing means in accordance with a magnitude of the machining current value. The predetermined period of time is properly set to a time duration of the spike voltage generated in accordance with a magnitude of the machining current value, and error factors in the integrated value are eliminated by stopping the integrations as above. Here, the starting and stopping of the first integrating means and second integrating means are controlled by the control means. Then, the integrated value from the first integrating means is compared with the integrated value from the second integrating means through the comparing means. In this way, a mask time limit is changed in accordance with the value of the machining current, so that it is possible to surely eliminate influence of disturbances and perform accurate detection of the electrical discharge state.

According to the electrical discharge state detecting device for an electrical discharge machine of the fifth embodiment, the high-frequency component, which is superimposed on either the electrical discharge voltage or the electrical discharge current at the machining clearance between the electrode and the workpiece, is detected by the high-frequency component detecting means. The high-frequency component is rectified by the rectifying means. The magnitude of the outputted rectified component is integrated over time by the first integrating means and added only for the number of continual electrical discharge pulses counted by the count means. In addition, the magnitude of the reference voltage outputted from the reference voltage output means is integrated over time by the second integrating means and added only for the number of continual electrical discharge pulses counted by the count means.

Here, the starting and ending of the integrations in the first integrating means and second integrating means are controlled by the control means. Then, the integrated value obtained by the first integrating means is compared with the integrated value obtained by the second integrating means through the comparing means. In this way, the high-frequency component are integrated over time for the continual electrical discharge pulses, so that it is possible to perform an accurate detection of the electrical discharge state even if the electrical discharge pulse width is narrow.

What is claimed is:

1. An electrical discharge state detecting device for an electrical discharge machine, comprising:

high-frequency component detecting means for detecting a high-frequency component superimposed on one of an electrical discharge voltage and an electrical discharge current at a machining clearance between an electrode and a workpiece;

rectifying means for outputting a rectified component obtained by rectifying said high-frequency component detected by said high-frequency component detecting means;

first integrating means for integrating, over time, a magnitude of said rectified component outputted from said rectifying means;

reference voltage output means for outputting a reference voltage;

second integrating means for integrating, over time, a magnitude of said reference voltage outputted from said reference voltage output means; integrating stopping means for stopping an integration in said first integrating means and said second integrating means only for a predetermined time on the basis of an operation of an internal switching element for use in current controlling of a machining power source;

control means for controlling starting and ending of integrations in said first integrating means and said second integrating means; and comparing means for comparing an integrated value obtained by said first integrating means with an integrated value obtained by said second integrating means.

2. An electrical discharge state detecting device for an electrical discharge machine operating on a workpiece, wherein said electrical discharge machine includes a power source under control of a switching element, said detecting device comprising:

an electrode disposed above the workpiece to detect an electrical discharge from the workpiece;

a high pass filter connected to said electrode to pass a high frequency component of the electrical discharge;

a rectifying circuit receiving the high frequency component and outputting a rectified signal;

a first integrator receiving the rectified signal as an input;

a reference voltage source supplying a reference voltage;

a second integrator receiving said reference voltage as an input;

a first mask limit circuit for detecting an on rise time of the power source in response to operation of the switching element;

a second mask limit circuit for detecting an off fall time of the power source in response to the switching element;

a logic circuit receiving outputs from said first and second mask limit circuits and outputting an integration control signal;

wherein said first integrator is connected and disconnected from the rectifying circuit in response to said integration control signal, wherein said second integrator is connected and disconnected from the reference voltage source in response to said integration control signal; and a comparator receiving outputs from said first and second integrators to determine a state of the discharge.

3. The electrical discharge state detecting device according to claim 2, further comprising:

a mask time adjustment circuit receiving a machining current value of the power source, wherein said mask time adjustment circuit adjusts the detected on rise time and the detected off fall time of the power source as respectively detected by said first and second mask time limit circuits in accordance with the machining current value.

4. The electrical discharge state detecting device according to claim 2, further comprising:

a first reset device for resetting said first integrator;

a second reset device for resetting said second integrator; and a counter which counts a number of the discharge of electrical characteristic and operates the first and second reset devices to reset said first and second integrators when the number of discharges reaches a predetermined number.

* * * * *